(12) United States Patent
Kwak et al.

(10) Patent No.: US 11,178,438 B2
(45) Date of Patent: *Nov. 16, 2021

(54) BROADCAST SIGNAL TRANSMITTING/RECEIVING DEVICE AND METHOD

(71) Applicant: LG ELECTRONICS INC., Seoul (KR)

(72) Inventors: Minsung Kwak, Seoul (KR); Woosuk Kwon, Seoul (KR); Seungryul Yang, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/995,415

(22) Filed: Aug. 17, 2020

(65) Prior Publication Data

US 2021/0006845 A1 Jan. 7, 2021

Related U.S. Application Data

(63) Continuation of application No. 16/085,531, filed as application No. PCT/KR2017/002974 on Mar. 20, 2017, now Pat. No. 10,750,217.

(Continued)

(51) Int. Cl.
*H04N 7/173* (2011.01)
*H04N 21/2381* (2011.01)
(Continued)

(52) U.S. Cl.
CPC ..... *H04N 21/2381* (2013.01); *H04L 65/4076* (2013.01); *H04N 21/236* (2013.01);
(Continued)

(58) Field of Classification Search
CPC ............ H04N 21/2381; H04N 21/236; H04N 21/2343; H04N 21/4345; H04N 21/234345; H04N 21/23605; H04N 21/434
(Continued)

(56) References Cited

U.S. PATENT DOCUMENTS 5,144,425 A * 9/1992 Joseph ................... H04N 19/37
375/240.05
6,154,203 A 11/2000 Yuen .................... G11B 23/042
725/52

(Continued)

FOREIGN PATENT DOCUMENTS

WO 2015/040914 A1 3/2015

OTHER PUBLICATIONS

Advanced Television Systems Committee, "ATSC Candidate Standard: Signaling, Delivery, Synchronization, and Error Protection (A/331)", Doc. S33-174r1, Jan. 5, 2016, see pp. 11 and 14-20.

(Continued)

*Primary Examiner* — Michael B. Pierorazio
(74) *Attorney, Agent, or Firm* — Dentons US LLP

(57) ABSTRACT

Disclosed is a broadcast signal transmitting method. The broadcast signal transmitting method according to an embodiment of the present invention may comprise: generating low level signaling, LLS, information; encapsulating the LLS information into an IP packet; and generating a signal frame by physical layer processing the LLS information. The LLS information may comprise comprises LLS ID information identifying a type of the LLS information and the type of the LLS information may comprise at least one of EA information providing information related to emergency alert and screen clear information providing information related to screen clear.

12 Claims, 20 Drawing Sheets

Related U.S. Application Data

(60) Provisional application No. 62/310,818, filed on Mar. 21, 2016, provisional application No. 62/341,099, filed on May 25, 2016, provisional application No. 62/351,889, filed on Jun. 17, 2016.

(51) Int. Cl.
*H04N 21/236* (2011.01)
*H04N 21/2343* (2011.01)
*H04N 21/434* (2011.01)
*H04L 29/06* (2006.01)

(52) U.S. Cl.
CPC ... *H04N 21/2343* (2013.01); *H04N 21/23605* (2013.01); *H04N 21/234345* (2013.01); *H04N 21/434* (2013.01); *H04N 21/4345* (2013.01)

(58) Field of Classification Search
USPC .......................................................... 725/116
See application file for complete search history.

(56) References Cited

U.S. PATENT DOCUMENTS

| | | | | |
|---|---|---|---|---|
| 6,263,022 B1* | 7/2001 | Chen | H04N 19/126 | 375/240.03 |
| 6,490,705 B1* | 12/2002 | Boyce | H04N 19/66 | 375/E7.088 |
| 6,496,217 B1* | 12/2002 | Piotrowski | H04N 21/234318 | 348/14.08 |
| 6,501,797 B1* | 12/2002 | van der Schaar | H04N 19/146 | 375/240.12 |
| 6,674,477 B1* | 1/2004 | Yamaguchi | H04N 19/176 | 348/387.1 |
| 7,095,782 B1* | 8/2006 | Cohen | H04N 21/234327 | 348/410.1 |
| 7,870,583 B2 | 1/2011 | Kim | H04N 5/44591 | 348/731 |
| 7,958,532 B2* | 6/2011 | Paul | H04N 21/631 | 725/90 |
| 8,064,389 B2* | 11/2011 | Khan | H04L 1/0041 | 370/329 |
| 8,072,943 B2* | 12/2011 | Khan | H04H 20/30 | 370/335 |
| 8,284,845 B1* | 10/2012 | Kovacevic | H04N 21/44016 | 375/240.26 |
| 8,418,203 B1 | 4/2013 | Nishio | H04N 21/4349 | 725/42 |
| 8,467,656 B2* | 6/2013 | Kamio | H04N 9/8042 | 386/200 |
| 8,904,445 B2* | 12/2014 | Britt | H04N 21/4334 | 725/58 |
| 9,003,450 B2 | 4/2015 | Suh | G11B 27/34 | 725/54 |
| 2004/0208239 A1* | 10/2004 | Karlsson | H04K 3/82 | 375/219 |
| 2007/0179948 A1* | 8/2007 | Jennings, III | H04L 67/104 | |
| 2008/0062168 A1* | 3/2008 | Poullier | H04N 1/00132 | 345/419 |
| 2008/0120645 A1* | 5/2008 | Yun | H04N 21/435 | 725/33 |
| 2008/0170630 A1* | 7/2008 | Falik | H04L 47/26 | 375/240.29 |
| 2009/0034629 A1* | 2/2009 | Suh | H04H 20/57 | 375/240.27 |
| 2009/0187960 A1* | 7/2009 | Lee | H04N 21/234327 | 725/131 |
| 2009/0222855 A1* | 9/2009 | Vare | H04L 12/189 | 725/39 |
| 2009/0268806 A1* | 10/2009 | Kim | H04N 21/4408 | 375/240.01 |
| 2010/0254370 A1* | 10/2010 | Jana | H04N 21/23439 | 370/352 |
| 2010/0260254 A1* | 10/2010 | Kimmich | H04N 21/631 | 375/240.01 |
| 2010/0260268 A1* | 10/2010 | Cowan | H04N 19/46 | 375/240.25 |
| 2011/0002397 A1* | 1/2011 | Wang | H04N 19/30 | 375/240.26 |
| 2011/0096828 A1* | 4/2011 | Chen | H04N 21/84 | 375/240.02 |
| 2011/0164683 A1* | 7/2011 | Takahashi | H04N 19/70 | 375/240.16 |
| 2011/0187503 A1* | 8/2011 | Costa | H05K 7/1498 | 340/8.1 |
| 2011/0239078 A1* | 9/2011 | Luby | H04N 21/234327 | 714/752 |
| 2011/0289542 A1* | 11/2011 | Kitazato | H04N 21/2625 | 725/115 |
| 2012/0117592 A1* | 5/2012 | Strein | H04N 21/26283 | 725/32 |
| 2012/0185907 A1* | 7/2012 | Park | H04N 21/242 | 725/110 |
| 2012/0224651 A1* | 9/2012 | Murakami | H04L 25/03898 | 375/295 |
| 2012/0250619 A1* | 10/2012 | Twitchell, Jr. | H04W 40/28 | 370/328 |
| 2012/0320168 A1* | 12/2012 | Yun | H04N 21/4345 | 348/51 |
| 2013/0136193 A1* | 5/2013 | Hwang | H04L 65/80 | 375/240.27 |
| 2013/0247094 A1* | 9/2013 | Hardin | H04N 21/814 | 725/33 |
| 2013/0305304 A1* | 11/2013 | Hwang | H04N 21/238 | 725/109 |
| 2014/0050458 A1* | 2/2014 | Mochinaga | H04N 13/337 | 386/239 |
| 2014/0098289 A1* | 4/2014 | Jang | H04N 7/0117 | 348/441 |
| 2014/0115472 A1* | 4/2014 | Mochinaga | H04N 13/189 | 715/719 |
| 2014/0119712 A1* | 5/2014 | Jang | G11B 20/10 | 386/248 |
| 2014/0204177 A1* | 7/2014 | Hattori | H04N 19/44 | 348/43 |
| 2014/0211861 A1* | 7/2014 | Lee | H04N 19/33 | 375/240.27 |
| 2015/0020131 A1* | 1/2015 | Choi | H04N 21/2381 | 725/109 |
| 2016/0277778 A1* | 9/2016 | Kwon | H04N 21/2362 | |
| 2017/0164033 A1* | 6/2017 | Tsukagoshi | H04N 21/236 | |
| 2017/0188112 A1* | 6/2017 | Takahashi | H04L 29/06517 | |
| 2018/0146022 A1* | 5/2018 | Kwon | H04N 21/4345 | |

OTHER PUBLICATIONS

U.S. Appl. No. 16/085,531, filed Aug. 14, 2018.

* cited by examiner

[Figure 1]
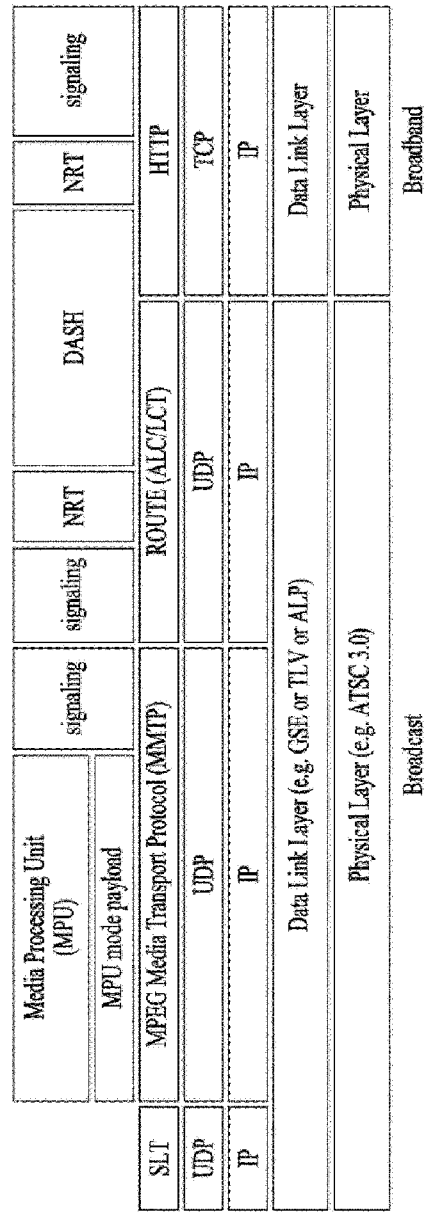

[Figure 2]
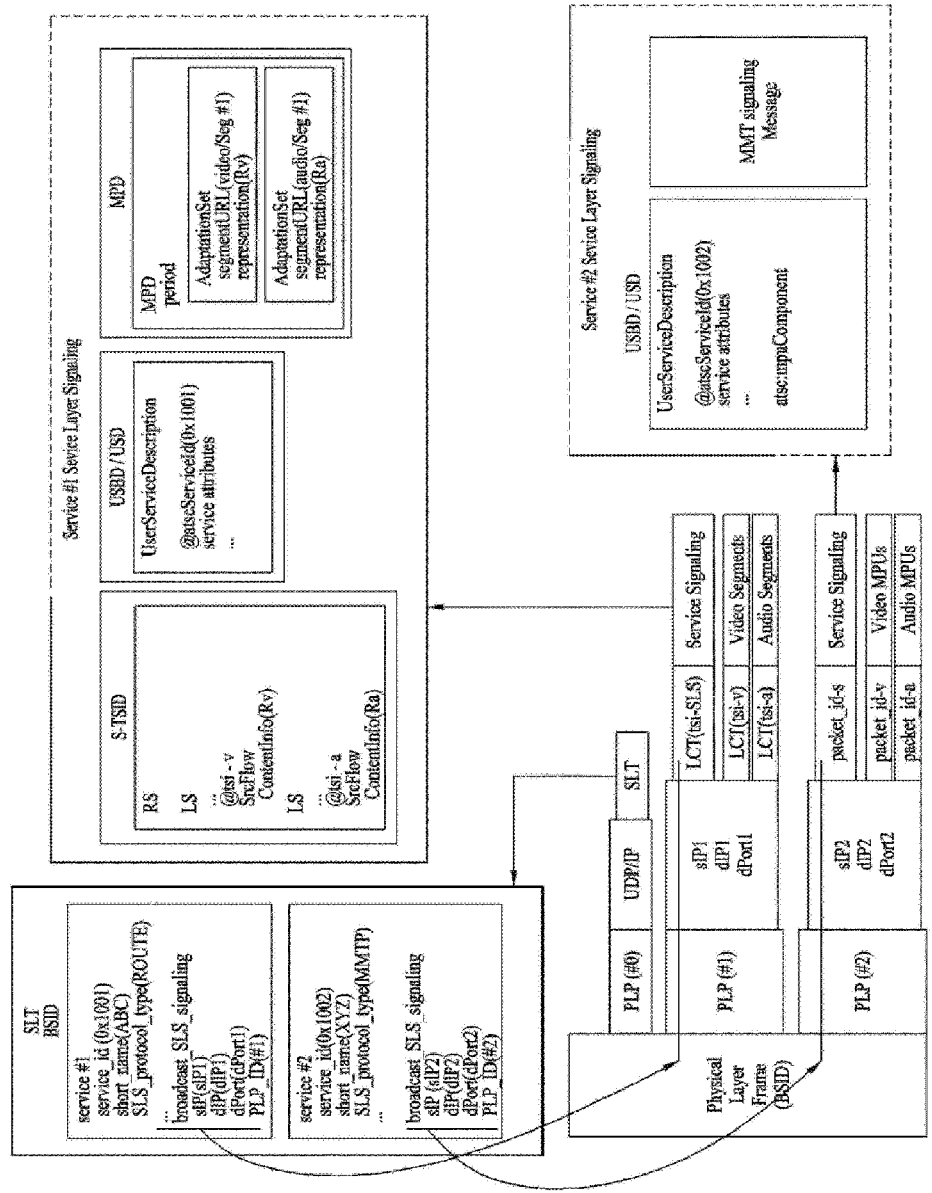

【Figure 3】

| Syntax | No. of Bits | Format |
|---|---|---|
| LLS_table() { | | |
|   LLS_table_id | 8 | uimsbf |
|   provider_id | 8 | uimsbf |
|   LLS_table_version | 8 | uimsbf |
|   switch (LLS_table_id) { | | |
|     case 0x01: | | |
|       SLT | var | Sec. 6.3 |
|       break; | | |
|     case 0x02: | | |
|       RRT | var | See Annex F |
|       break; | | |
|     case 0x03: | | |
|       System Time | var | Sec. 6.4 |
|       break; | | |
|     case 0x04: | | |
|       CAP | var | Sec. 6.5 |
|       break; | | |
|     default: | | |
|       reserved | var | |
|   } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1..999 |
|     @minorChannelNo | 0..1 | 1..999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcSignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

[Figure 4]

| Element or Attribute Name | | | | Use | Data Type |
|---|---|---|---|---|---|
| bundleDescription | | | | | |
| | userServiceDescription | | | | |
| | | @globalServiceID | | 1 | anyURL |
| | | @serviceID | | 1 | unsignedShort |
| | | @serviceStatus | | 0..1 | boolean |
| | | @fullMPDUri | | 1 | anyURL |
| | | @sTSIDUri | | 1 | anyURL |
| | | name | | 0..N | string |
| | | | @lang | 1 | language |
| | | serviceLanguage | | 0..N | language |
| | | capabilityCode | | 0..1 | string |
| | | deliveryMethod | | 1..N | |
| | | | broadcastAppService | 1..N | |
| | | | basePattern | 1..N | string |
| | | | unicastAppService | 0..N | |
| | | | basePattern | 1..N | string |

— t4010

| Element or Attribute Name | | Use | Data Type |
|---|---|---|---|
| S-TSID | | | |
| | @serviceID | 1 | unsignedShort |
| RS | | 1..N | |
| | @bsid | 0..1 | unsignedShort |
| | @sIpAddr | 0..1 | string |
| | @dIpAddr | 0..1 | string |
| | @dport | 0..1 | unsignedShort |
| | @PLPID | 0..1 | unsignedByte |
| LS | | 1..N | |
| | @tsi | 1 | unsignedInt |
| | @PLPID | 0..1 | unsignedByte |
| | @bw | 0..1 | unsignedInt |
| | @startTime | 0..1 | dateTime |
| | @endTime | 0..1 | dateTime |
| | SrcFlow | 0..1 | srcFlowType |
| | RepairFlow | 0..1 | rprFlowType | t4020

【Figure 5】

| Element or Attribute Name | Use |
|---|---|
| bundleDescription | |
|   userServiceDescription | |
|     @globalServiceID | M |
|     @serviceID | M |
|     Name | 0..N |
|       @lang | CM |
|     serviceLanguage | 0..N |
|     contentAdvisoryRating | 0..1 |
|     Channel | 1 |
|       @serviceGenre | 0..1 |
|       @serviceIcon | 1 |
|       ServiceDescription | 0..N |
|         @serviceDescrText | 1 |
|         @serviceDescrLang | 0..1 |
|     mpuComponent | 0..1 |
|       @mmtPackageId | 1 |
|       @nextMmtPackageId | 0..1 |
|     routeComponent | 0..1 |
|       @sTSIDUri | 1 |
|       @sTSIDDestinationIpAddress | 0..1 |
|       @sTSIDDestinationUdpPort | 1 |
|       @sTSIDSourceIpAddress | 1 |
|       @sTSIDMajorProtocolVersion | 0..1 |
|       @sTSIDMinorProtocolVersion | 0..1 |
|     broadbandComponent | 0..1 |
|       @fullMPDUri | 1 |
|     ComponentInfo | 1..N |
|       @ComponentType | 1 |
|       @ComponentRole | 1 |
|       @ComponentProtectedFlag | 0..1 |
|       @ComponentId | 1 |
|       @ComponentName | 0..1 |

[Figure 6]
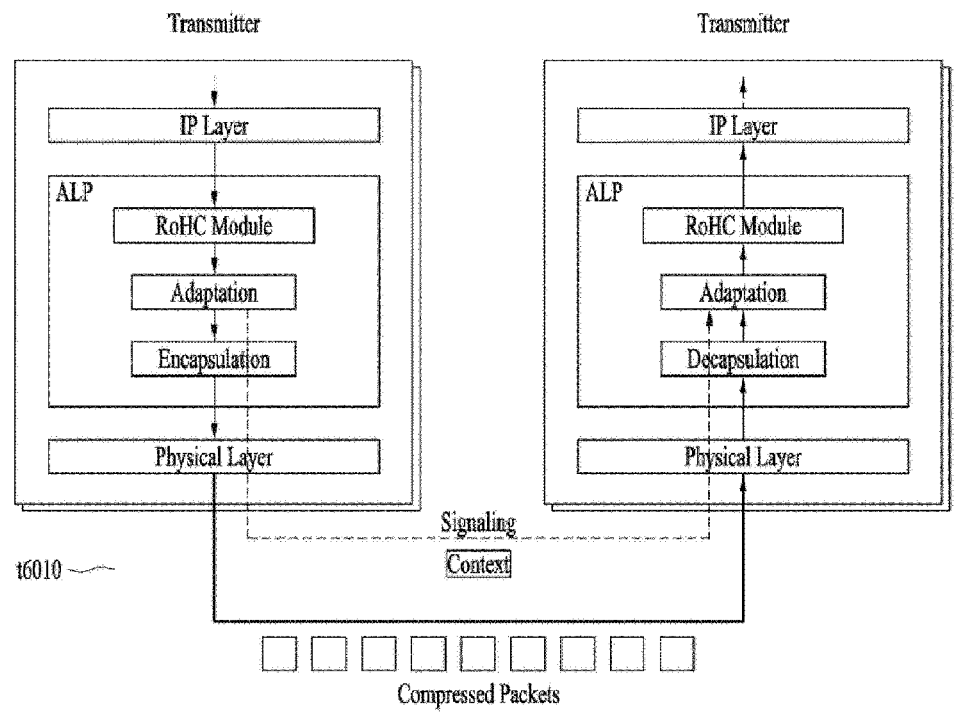
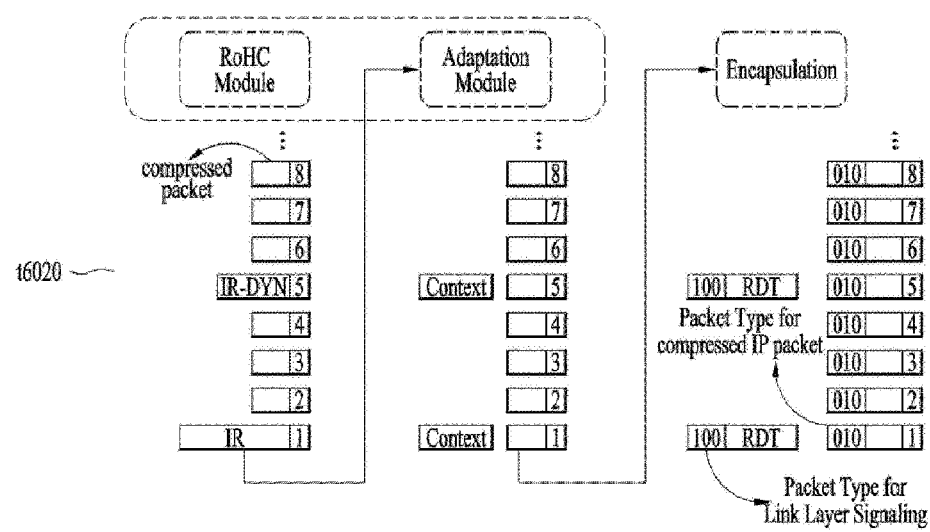

[Figure 7]

| Syntax | Number of bits | Format |
|---|---|---|
| Link_Mapping_Table() { | | |
|     signaling_type | 8 | 0x01 |
|     PLP_ID | 6 | uimsbf |
|     reserved | 2 | "11" |
|     num_session | 8 | uimsbf |
|     for(i = 0 ; i < num_session ; i++) { | | |
|         src_IP_add | 32 | uimsbf |
|         dst_IP_add | 32 | uimsbf |
|         src_UDP_port | 16 | uimsbf |
|         dst_UDP_port | 16 | uimsbf |
|         SID_flag | 1 | bslbf |
|         compressed_flag | 1 | bslbf |
|         reserved | 6 | '111111' |
|         if (SID_flag == "1") { | | |
|             SID | 8 | uimsbf |
|         } | | |
|         if (compressed_flag == "1') { | | |
|             context_id | 8 | uimsbf |
|         } | | |
|     } | | |
| } | | |

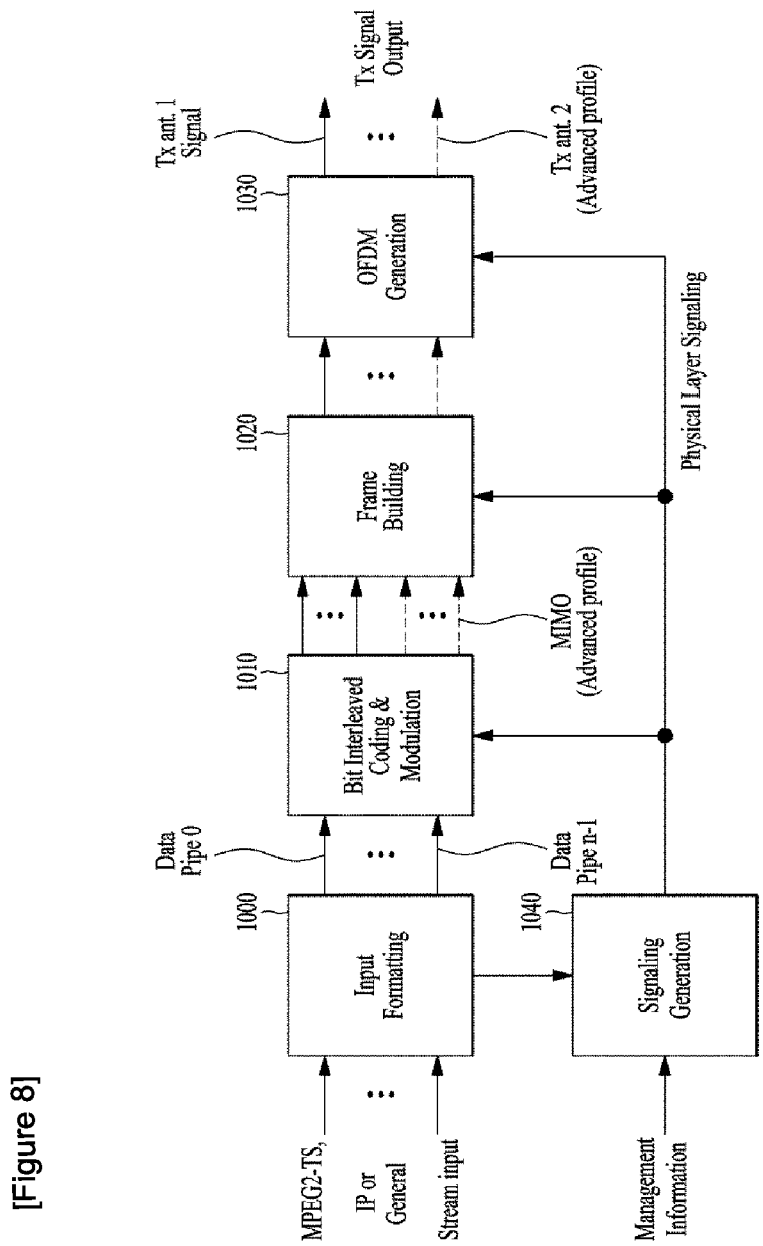
[Figure 8]

[Figure 9]

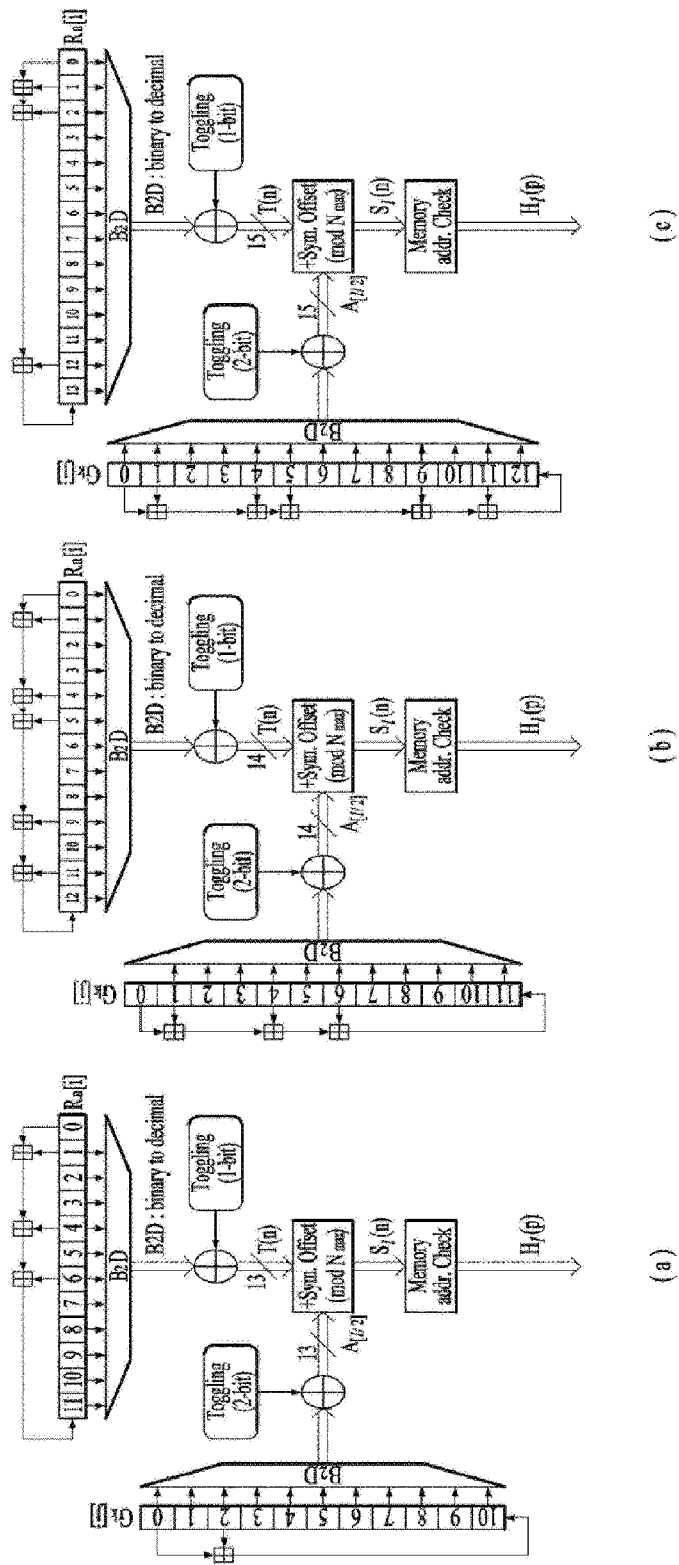
[Figure 10]

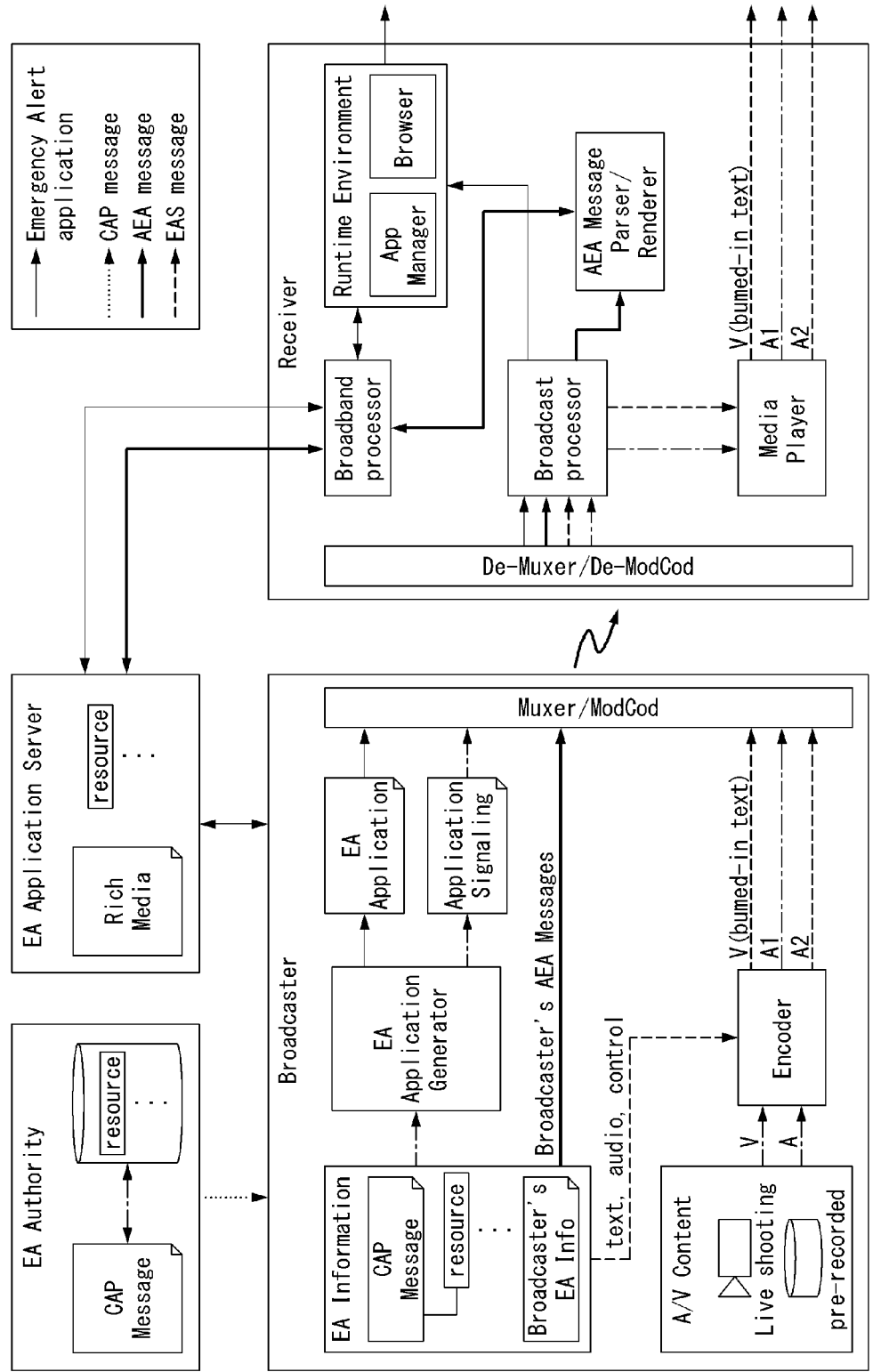
[Figure 11]

【Figure 12】

| Element or Attribute Name | | Datatype | Description |
|---|---|---|---|
| parameter | | | Extension for "info" identifier |
| | valueName | string | "id" |
| | value | unsignedInt | identifier of "info" element, unique within EAT |
| parameter | | | Extension for "info" version |
| | valueName | string | "version" |
| | value | unsignedInt | identifier of "info" element, unique within EAT |
| parameter | | | Extension for banner "burned" in indicator |
| | valueName | string | "burned" |
| | value | unsignedInt | "true" if banner burned in; "false" if not |
| parameter | | | Extension for banner position |
| | valueName | string | "position" |
| | value | unsignedInt | <X1>,<Y1>,<X2>,<Y2>, where X1 is |
| parameter | | | Extension for banner audio URL |
| | valueName | string | "audioURL" |
| | value | unsignedInt | URL of banner audio, to be matched with URL of resource |
| parameter | | | Extension for service ID |
| | valueName | string | "serviceID" |
| | value | unsignedInt | SLT service id of service delivering rich media resources |

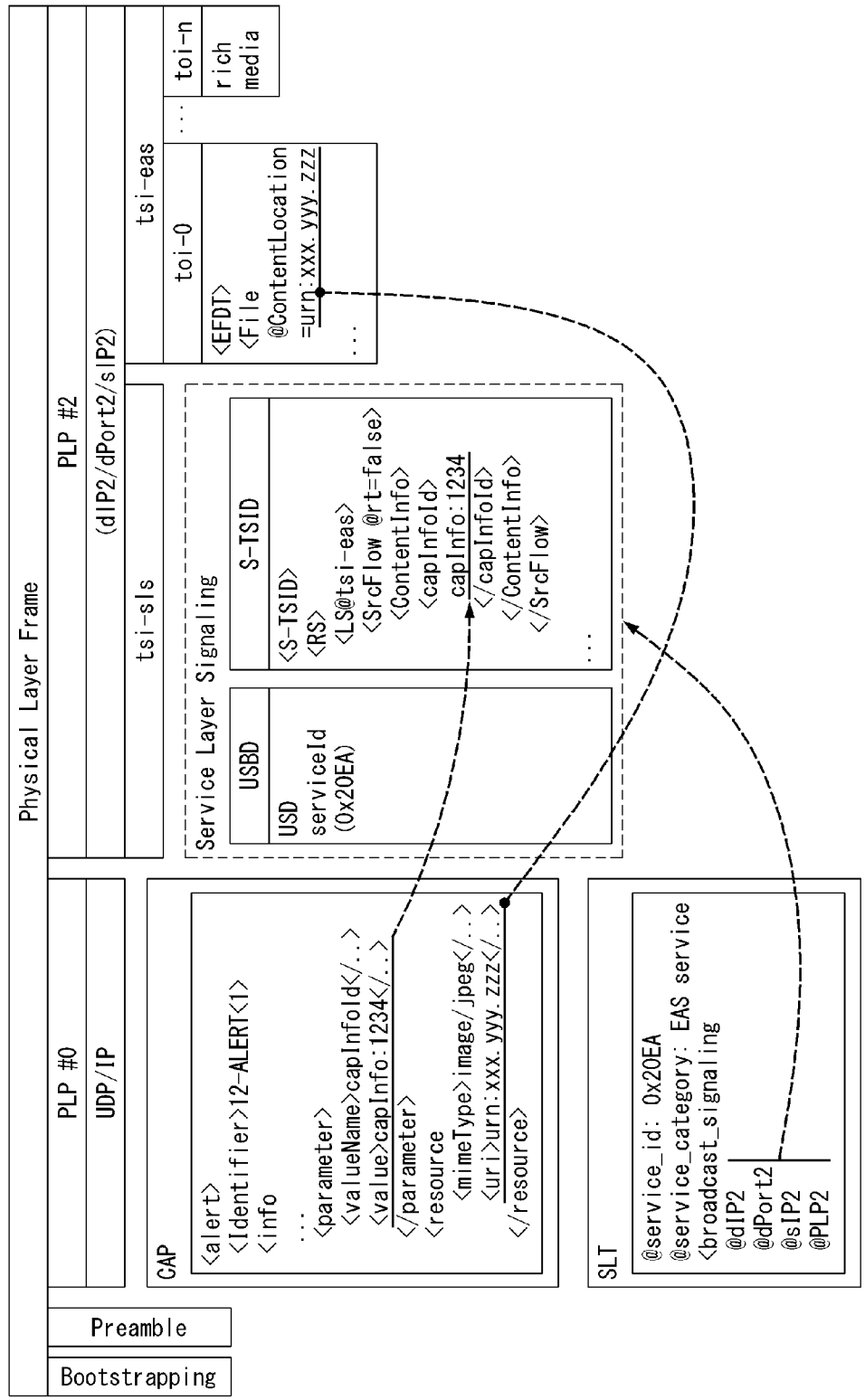
[Figure 13]

[Figure 14]

| Element or Attribute Name | | Datatype | Description |
|---|---|---|---|
| parameter | | | |
| | valueName | string | "burnedInUntil" |
| | value | xs:dateTime | The date and time when the banner is not burned in any more. If it does not indicate the specific date and time information, it is assumed that the banner will not be burned in any more in undefined time in the future. |

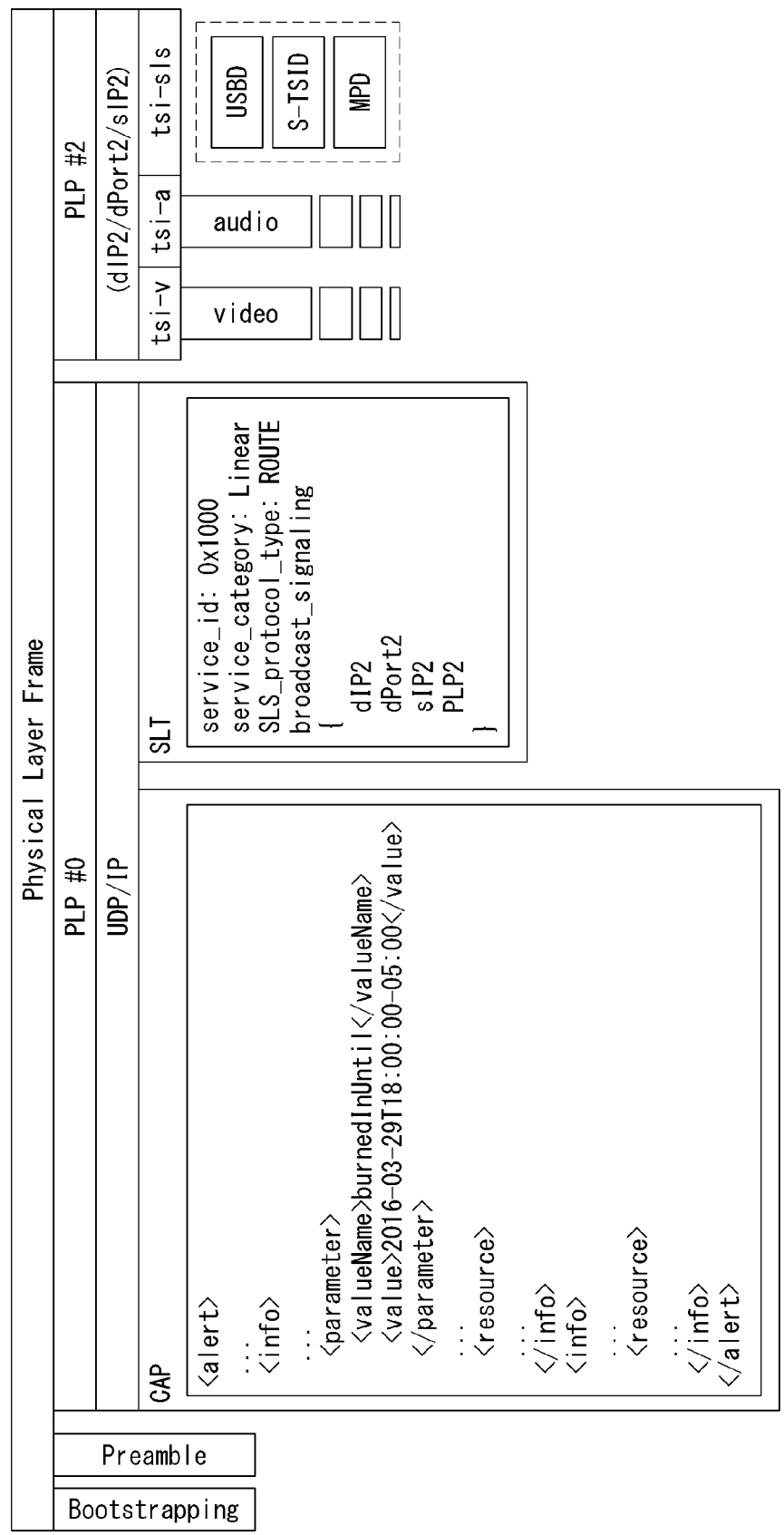
[Figure 15]

【Figure 16】

| Syntax | No. of Bits | Format |
|---|---|---|
| LLS_table() { | | |
|   LLS_table_id | 8 | uimsbf |
|   provider_id | 8 | uimsbf |
|   LLS_table_version | 8 | uimsbf |
|   switch (LLS_table_id) | | |
|   { | | |
|     case 0x01: | | |
|       SLT | var | Sec. 6.3 |
|       break; | | |
|     case 0x02: | | |
|       RRT | var | See Annex F |
|       break; | | |
|     case 0x03: | | |
|       SystemTime | var | Sec. 6.4 |
|       break; | | |
|     case 0x04: | | |
|       EaMessage | var | Sec. 6.5 |
|       break; | | |
|     default: | | |
|       reserved | var | |
|   } | | |
| } | | |

【Figure 17】

```
<EA_message>
<sequence>
  <EASMessage minOccurs="0" >
    <AEA-MF minOccurs="0" > ··· </AEA_MF>
</sequence>
</EA_message>
```

[Figure 18]

```
<EA_message>
<sequence>
  <AEA-MF minOccurs=" 0" >
    ...
      <delay_timer>00:30</delay_timer>
    </AEA-MF>
</sequence>
</EA_message>
```

[Figure 19]

| Syntax | No. of Bits | Format |
|---|---|---|
| LLS_table() { | | |
|   LLS_table_id | 8 | uimsbf |
|   provider_id | 8 | uimsbf |
|   LLS_table_version | 8 | uimsbf |
|   switch (LLS_table_id) | | |
|   { | | |
|     case 0x01: | | |
|       SLT | var | Sec. 6.3 |
|       break; | | |
|     case 0x02: | | |
|       RRT | var | See Annex F |
|       break; | | |
|     case 0x03: | | |
|       SystemTime | var | Sec. 6.4 |
|       break; | | |
|     case 0x04: | | |
|       AEAT | var | Sec. 6.5 |
|       break; | | |
|     case 0x05: | | |
|       KeepClearFlag | var | Sec. 6.6 |
|       break; | | |
|     default: | | |
|       reserved | var | |
|   } | | |
| } | | |

【Figure 20】

| Element or Attribute Name | | | | Use | Data type |
|---|---|---|---|---|---|
| AEAT | | | | | |
| | AEA | | | 1..N | |
| | | @aeaId | | 1 | string |
| | | @audience | | 0..1 | string |
| | | @aeaType | | 0..1 | string |
| | | @referenceAeaId | | 0..1 | string |
| | | @priority | | 1 | unsignedByte |
| | | @delayTimer | | 0..1 | string |
| | | Header | | 1 | |
| | | | @effective | 1 | dateTime |
| | | | @expires | 1 | dateTime |
| | | | EventCode | 1 | string |
| | | | @type | 0..1 | string |
| | | | Location | 1..N | string |
| | | | @type | 1 | string |
| | | AeaText | | 1..N | string |
| | | | @lang | 1 | Language |
| | | Media | | 0..N | |
| | | | @lang | 0..1 | Language |
| | | | @mediaUri | 1 | anyURI |
| | | | MediaDesc | 0..1 | string |
| | | | @lang | 0..1 | Language |
| | | | MediaDerefUri | 0..1 | string |
| | | Signature | | 0..1 | any |

【Figure 21】
| Element or Attribute Name | | Use | Data type |
|---|---|---|---|
| KeepClearFlag | | | |
| | @bsid | 1 | unsignedShort |
| | @flag | 0..1 | Boolean |
| | @serviceId | 0..1 | List of unsignedShort |
| | @serviceIdRange | 0..1 | unsignedByte |
| | @version | 1 | unsignedByte |
【Figure 22】
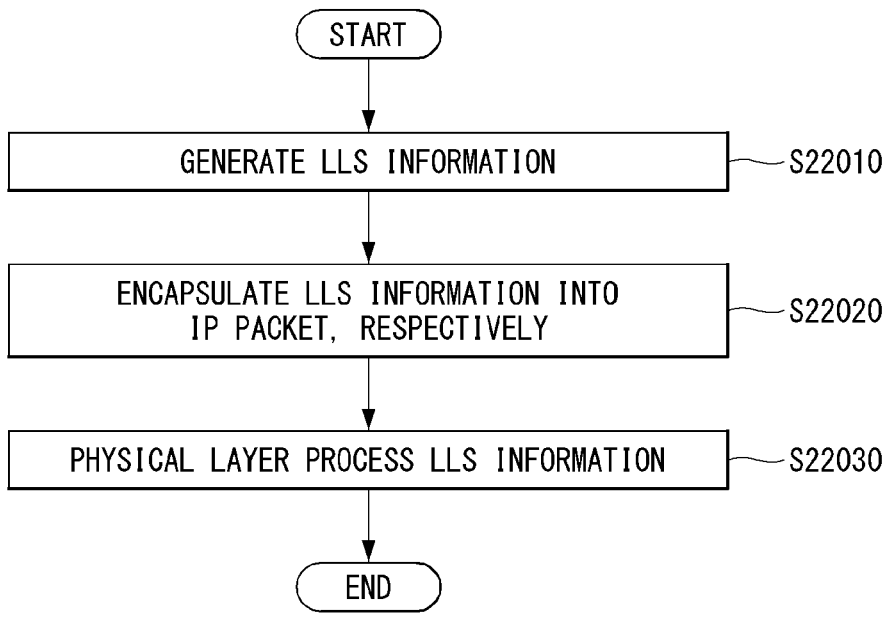

【Figure 23】
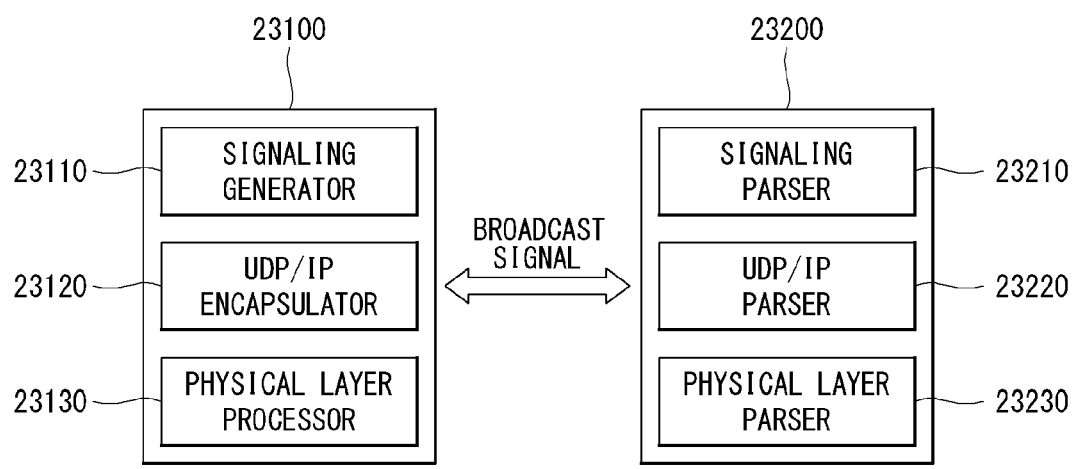

BROADCAST SIGNAL TRANSMITTING/RECEIVING DEVICE AND METHOD

CROSS-REFERENCE TO RELATED APPLICATIONS

This application is a continuation application of U.S. patent application Ser. No. 16/085,531, filed Aug. 14, 2018, which is a National Stage entry of International Application No. PCT/KR2017/002974, filed on Mar. 20, 2017, and claims the benefit of and priority to Provisional Application Nos. 62/341,099, filed Mar. 21, 2016, 62/341,099, filed May 25, 2015, 62/351,889, filed Jun. 17, 2016, all of which are incorporated by reference in their entirety herein.

TECHNICAL FIELD

The present invention relates to an apparatus for transmitting a broadcast signal, an apparatus for receiving a broadcast signal, a method for transmitting a broadcast signal, and a method for receiving a broadcast signal.

BACKGROUND ART

Along with cessation of analog broadcasting, various technologies for transmitting and receiving a digital broadcast signal are being developed. A digital broadcast signal may carry a larger amount of video or audio data than an analog broadcast signal and may further include various types of additional data as well as video or audio data.

DISCLOSURE

Technical Problem

A digital broadcast system may provide High Definition (HD) images, multi-channel audio, and various additional services. However, to operate digital broadcasting, network flexibility needs to be improved in consideration of data transfer efficiency for transmission of a large amount of data, robustness of a transmission and reception network, and mobile reception devices.

Technical Solution

In order to achieve the technical objects, the present invention proposes a broadcast signal transmitting method and a broadcast signal transmitting apparatus.

A broadcast signal transmitting method according to an embodiment of the present invention includes: generating low level signaling, LLS, information; encapsulating the LLS information into an IP packet; and generating a signal frame by physical layer processing the LLS information, and the LLS information may comprise LLS ID information identifying a type of the LLS information and the type of the LLS information includes at least one of EA information providing information related to emergency alert and screen clear information providing information related to screen clear.

A broadcast signal transmitter according to an embodiment of the present invention comprises: a signaling generator generating low level signaling, LLS, information; an IP encapsulator encapsulating the LLS information into an IP packet; and a physical layer processor generating a signal frame by physical layer processing the LLS information, and the LLS information may comprise LLS ID information identifying a type of the LLS information and the type of the LLS information comprises at least one of EA information providing information related to emergency alert and screen clear information providing information related to screen clear.

As an embodiment, the screen clear information may comprise version information which indicates a version of the screen clear information.

As an embodiment, the screen clear information may comprise at least one of BSID information indicating ID of a broadcast stream, service ID information indicating ID of a service in a range of a broadcast stream which is related to the screen clear information, service ID range information indicating the range of the service ID information which is related to the screen clear information, and flag information indicating a status of the screen clear information.

As an embodiment, the LLS information may comprise duration information which is used for indicating duration of the screen clear status.

As an embodiment, the duration information may be comprised in the EA information or the screen clear information.

As an embodiment, the IP packet may have a predetermined IP address.

Advantageous Effects

The present invention processes data according to the characteristics of a service and controls Quality of Service (QoS) for each service or service component, thereby providing various broadcast services.

The present invention transmits various broadcast services through the same Radio Frequency (RF) signal band, thereby achieving transmission flexibility.

The present invention is capable of providing a method and an apparatus for transmitting and receiving a broadcast signal by which a digital broadcast signal may be received without an error even with a mobile reception device or in an indoor environment.

The present invention effectively supports future broadcast services in an environment supporting future hybrid broadcast systems employing a terrestrial broadcast network and Internet network.

In what follows, additional effects brought by the present invention will be described together with a structure of the present invention.

DESCRIPTION OF DRAWINGS

FIG. 1 is a diagram showing a protocol stack according to an embodiment of the present invention.

FIG. 2 is a diagram showing a service discovery procedure according to one embodiment of the present invention.

FIG. 3 is a diagram showing a low level signaling (LLS) table and a service list table (SLT) according to one embodiment of the present invention.

FIG. 4 is a diagram showing a USBD and an S-TSID delivered through ROUTE according to one embodiment of the present invention.

FIG. 5 is a diagram showing a USBD delivered through MMT according to one embodiment of the present invention.

FIG. 6 is a diagram showing link layer operation according to one embodiment of the present invention.

FIG. 7 is a diagram showing a link mapping table (LMT) according to one embodiment of the present invention.

FIG. 8 illustrates a configuration of a broadcast signal transmission apparatus for future broadcast services according to an embodiment of the present invention.

FIG. 9 illustrates a write operation of a time interleaver according to an embodiment of the present invention.

FIG. 10 illustrates an interleaving address generator including a main pseudo-random binary sequence (PRBS) generator and a sub-PRBS generator according to each FFT mode which are included in a frequency interleaver according to an embodiment of the present invention.

FIG. 11 illustrates an EA system according to an embodiment of the present invention.

FIG. 12 illustrates extension of a CAP message for providing burned-in information according to an embodiment of the present invention.

FIG. 13 illustrates rich media content signaling delivered to a broadcast network according to an embodiment of the present invention.

FIG. 14 illustrates extension of a CAP message for providing burned-in information according to another embodiment of the present invention.

FIG. 14 illustrates a method for transmitting EA information using a UDP/IP according to an embodiment of the present invention.

FIG. 15 illustrates a method for providing the bundled information of FIG. 14.

FIG. 16 illustrates an LLS table according to another embodiment of the present invention.

FIG. 17 illustrates a method for signaling an EAS message using EAS flag information according to an embodiment of the present invention.

FIG. 18 illustrates an EAS signaling method using delay timer information according to an embodiment of the present invention.

FIG. 19 illustrates an LLS table according to yet another embodiment of the present invention.

FIG. 20 illustrates AEAT information according to an embodiment of the present invention.

FIG. 21 illustrates KCF information according to an embodiment of the present invention.

FIG. 22 illustrates a method for transmitting a broadcast signal according to an embodiment of the present invention.

FIG. 23 illustrates a broadcast signal transmitter and a broadcast signal receiver according to an embodiment of the present invention.

MODE FOR INVENTION

In what follows, preferred embodiments of the present invention are described in detail with reference to appended drawings. Detailed descriptions with reference to appended drawings are not necessarily limited only to the embodiments which may be implemented according to the present invention but rather intended to describe preferred embodiments of the present invention. The following descriptions given below include specific details for a thorough understanding of the present invention. However, it should be clearly understood by those skilled in the art that the present invention may be implemented without involving the specific details.

Most of the terms used in the present invention have been chosen among those terms widely accepted in the corresponding field. However, some of the terms are selected arbitrarily by the applicant and their meaning will be described in detail in the following descriptions if needed. Therefore, the present invention should be understood not by the apparent names or immediate meanings of the terms but by the intended meanings of the terms.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO or MIMO according to one embodiment. A non-MIMO scheme according to an embodiment of the present invention may include a multiple input single output (MISO) scheme, a single input single output (SISO) scheme, etc. The present invention proposes a physical profile (or system) optimized to minimize receiver complexity while attaining the performance required for a particular use case.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @slpAddr attribute, an @dlpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @slpAddr attribute, the @dlpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fulIMP-DUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSID-MinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSID-SourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset_id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may employ a header compressor/decompressor and/or an adaptation module. The IP header compressor (RoHC compressor) may reduce the size of each IP packet header based on the RoHC scheme. Thereafter, the adaptation module may extract context information and generate signaling information from each packet stream. A receiver may parse signaling information associated with the packet stream and attach context information to the packet stream. The RoHC decompressor may restore the packet header to reconfigure an original IP packet. Hereinafter, IP header compression may mean only IP header compression by a header compression or a combination of IP header compression and an adaptation process by an adaptation module. The same is true in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may provide construction of link layer signaling using context information and/or configuration parameters. The adaptation function may use previous configuration parameters and/or context information to periodically transmit link layer signaling through each physical frame.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. Here, the RDT may be context information (static chain and/or dynamic chain) and/or signaling information including information associated with header compression. In some embodiments, the RDT shall be transmitted whenever the context information is changed. In addition, in some embodiments, the RDT shall be transmitted every physical frame. In order to transmit the RDT every physical frame, the previous RDT may be reused.

The receiver may select a first PLP and first acquire signaling information of the SLT, the RDT, the LMT, etc., prior to acquisition of a packet stream. When signaling information is acquired, the receiver may combine the signaling information to acquire mapping between service—IP information—context information—PLP. That is, the receiver may check which service is transmitted in which IP streams or which IP streams are delivered in which PLP and acquire context information of the PLPs. The receiver may select and decode a PLP carrying a specific packet stream. The adaptation module may parse context information and combine the context information with the compressed packets. To this end, the packet stream may be restored and delivered to the RoHC decompressor. Thereafter, decompression may start. At this time, the receiver may detect IR packets to start decompression from an initially received IR packet (mode 1), detect IR-DYN packets to start decompression from an initially received IR-DYN packet (mode 2) or start decompression from any compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be predefined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions. Here, the higher layer session may also be referred to as multicast. Information on IP streams or transport sessions transmitted through a specific PLP may be acquired through the LMT. In contrast, information on through which PLP a specific transport session is delivered may be acquired.

The LMT may be delivered in any PLP identified as carrying LLS. Here, the PLP in which the LLS is delivered may be identified by an LLS flag of L1 detail signaling information of a physical layer. The LLS flag may be a flag field indicating whether the LLS is delivered in the PLP, each PLP. Here, L1 detail signaling information may correspond to the below-described PLS2 data.

That is, the LMT may be delivered in the same PLP along with the LLS. Each LMT shall describe mapping between PLPs and IP addresses/ports as described above. As described above, the LLS may include an SLT and the IP address/port described in the LMT may be any IP address/port associated with any service described in the SLT delivered in the same PLP as the LMT.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling_type field, a PLP_ID field, a num_session field and/or information on each session. Although the LMT of the shown embodiment describes IP streams transmitted through one PLP, a PLP loop may be added to the LMT to describe information on a plurality of PLPs in some embodiments. In this case, the LMT may describe, in a PLP loop, PLPs for any IP address/port associated with any service described in the SLT delivered together, as described above.

The signaling_type field may indicate the type of signaling information delivered by the table. The value of signaling_type field for the LMT may be set to 0x01. The signaling_type field may be omitted. The PLP_ID field may identify a target PLP to be described. If the PLP loop is used, each PLP_ID field may identify each target PLP. The PLP_ID field and subsequent fields thereof may be included in the PLP loop. The below-described PLP_ID field is an identifier for one PLP of the PLP loop and the below-described fields may be fields for the corresponding PLP.

The num_session field may indicate the number of higher layer sessions delivered through the PLP identified by the corresponding PLP_ID field. According to the number indicated by the num_session field, information on each session may be included. This information may include a src_IP_add field, a dst_IP_add field, a src_UDP_port field, a dst_UDP_port field, an SID_flag field, a compressed_flag field, an SID field and/or a context_id field.

The src_IP_add field, the dst_IP_add field, the src_UDP_port field and the dst_UDP_port field may indicate the source IP address, the destination IP address, the source UDP port and the destination UDP port of the transport session among the higher layer sessions delivered through the PLP identified by the corresponding PLP_ID field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. If header compression is applied (compressed_flag=1), the RDT may be present and the PLP ID field of the RDT may have the same value as the PLP_ID field associated with this compressed_flag field.

The SID field may indicate the SIDs (sub stream IDs) of the link layer packets delivering the transport session. These link layer packets may include SIDs having the same values as this SID field in the optional header thereof. To this end, the receiver may filter link layer packets using LMT information and the SID information of the link layer packet header, without parsing all link layer packets.

The context_id field may provide a reference for a context id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of the present invention, bootstrapping of an ESG service may be performed by a broadcast or broadband network. By acquiring the ESG over broadband, URL information of the SLT may be used. ESG information may be requested using this URL.

In another embodiment of the present invention, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver can confirm a segment to be requested from the broadband service and a segment to be detected in a broadcast stream.

In another embodiment of the present invention, scalable coding of a service may be performed. The USBD may have all capability information necessary to render the service. For example, when one service is provided in HD or UHD, the capability information of the USBD may have a value of "HD or UHD". The receiver may check which component is reproduced in order to render the UHD or HD service using the MPD.

In another embodiment of the present invention, through a TOI field of the LCT packets delivered through the LCT channel delivering the SLS, which SLS fragment is delivered using the LCT packets (USBD, S-TSID, MPD, etc.) may be identified.

In another embodiment of the present invention, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present invention, a CAP message may be included and provided in the above-described LLS table for emergency alert. Rich media content for emergency alert may also be provided. Rich media may be signaled by a CAP message and, if rich media is present, the rich media may be provided as an EAS service signaled by the SLT.

In another embodiment of the present invention, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present invention, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

FIG. 8 illustrates a configuration of a broadcast signal transmission apparatus for future broadcast services according to an embodiment of the present invention.

The broadcast signal transmission apparatus for future broadcast services according to the present embodiment may include an input formatting block 1000, a bit interleaved coding & modulation (BICM) block 1010, a frame building block 1020, an OFDM generation block 1030 and a signaling generation block 1040. Description will be given of an operation of each block of the broadcast signal transmission apparatus.

In input data according to an embodiment of the present invention, IP stream/packets and MPEG2-TS may be main input formats, and other stream types are handled as general streams.

The input formatting block 1000 may demultiplex each input stream into one or a plurality of data pipes, to each of which independent coding and modulation are applied. A DP is the basic unit for robustness control, which affects QoS. One or a plurality of services or service components may be carried by one DP. The DP is a logical channel in a physical layer for delivering service data or related metadata capable of carrying one or a plurality of services or service components.

Since QoS depends on characteristics of a service provided by the broadcast signal transmission apparatus for future broadcast services according to the embodiment of the present invention, data corresponding to respective services needs to be processed using different schemes.

BICM block 1010 may include a processing block for a profile (or system) to which MIMO is not applied, and a processing block for a profile (or system) to which MIMO is applied and may comprise a plurality blocks for processing each Data Pipe.

A processing block of the BICM block to which MIMO is not applied may include a data FEC encoder, a bit interleaver, a constellation mapper, a signal space diversity (SSD) encoding block and a time interleaver. A processing block of the BICM block to which MIMO is applied may is distinguished from the processing block of the BICM block to which MIMO is not applied in that the processing block further includes a cell-word demultiplexer and a MIMO encoding block The data FEC encoder performs FEC encoding on an input B BF to generate FECBLOCK procedure using outer coding (BCH) and inner coding (LDPC). The outer coding (BCH) is optional coding method. The bit interleaver may interleave outputs of the data FEC encoder to achieve optimized performance with a combination of LDPC codes and a modulation scheme while providing an efficiently implementable structure. A detailed operation of the bit interleaver will be described later. The constellation mapper may modulate each cell word from the bit interleaver or the cell-word demultiplexer in the advanced profile using either QPSK, QAM-16, non-uniform QAM NUQ-64, NUQ-256, or NUQ-1024) or non-uniform constellation (NUC-16, NUC-64, NUC-256, or NUC-1024) mapping to give a power-normalized constellation point. This constellation mapping is applied only for DPs. It is observed that QAM-16 and NUQs are square shaped, while NUCs have arbitrary shapes. Both NUQs and NUCs are defined specifically for each code rate and the particular one used is signaled by the parameter DP_MOD field in the PLS2 data. The time interleaver may operates at a DP level. Parameters of time interleaving (TI) may be set differently for each DP. The time interleaver according to an embodiment of the present invention can be positioned between a BICM chain block and a frame builder.

Here, the time interleaver according to an embodiment of the present invention can use both a convolutional interleaver (CI) and a block interleaver (BI) or selectively using either the CI or the BI according to a physical layer pipe (PLP) mode. A PLP according to an embodiment of the present invention is a physical path corresponding to the same concept as that of the above-described DP, and a name of the PLP may be changed by a de signer. A PLP mode according to an embodiment of the present invention may include a single PLP mode or a multi-PLP mode according to the number of PLPs processed by a broadcast signal transmitter or a broadcast signal transmission apparatus. In the present invention, time interleaving in which different time interleaving schemes are applied according to PLP modes may be referred to as hybrid time interleaving.

The hybrid time interleaver may include a BI and a CI. That is, when PLP_NUM=1, the BI is not applied (BI is turned OFF) and only the CI is applied. When PLP_NUM>1, both the BI and the CI may be applied (BI is turned ON). A structure and an operation of the CI applied when PLP_NUM>1 may be different from a case of PLP_NUM=1. The hybrid time deinterleaver may perform an operation corresponding to an inverse operation of the hybrid time interleaver described above.

The cell-word demultiplexer is used for dividing a single cell-word stream into dual cell-word streams for MIMO processing. The MIMO encoding block may process an output of the cell-word demultiplexer using a MIMO encoding scheme. The MIMO encoding scheme of the present invention may be defined as full-rate spatial multiplexing (FR-SM) to provide capacity increase with relatively small complexity increase at the receiver side. MIMO processing is applied at the DP level. NUQ ($e_{1,i}$ and $e_{2,i}$) corresponding to a pair of constellation mapper outputs is fed to an input of a MIMO encoder and paired MIMO encoder output ($g_{1,i}$ and $g_{2,i}$) is transmitted by the same carrier k and OFDM symbol I of respective TX antennas thereof.

The frame building block 1020 may map the data cells of the input DPs into the OFDM symbols within a frame, and perform frequency interleaving for frequency-domain diversity.

A frame according to an embodiment of the present invention is further divided into a preamble, one or more frame signaling symbols (FSSs), normal data symbols. The preamble provides a set of basic transmission parameters for efficient transmission and reception of a signal. And the preamble indicates whether the emergency alert service (EAS) is provided in a current frame or not. A main purpose of the FSS is to carry PLS data. For fast synchronization and channel estimation, and hence fast decoding of PLS data, the FSS has a dense pilot pattern than a normal data symbol.

The frame building block 1020 may include a delay compensation block for adjusting timing between DPs and corresponding PLS data to ensure that the DPs and the corresponding PLS data are co-timed at a transmitter side, a cell mapper for mapping PLS, DPs, auxiliary streams, dummy cells, etc. to active carriers of the OFDM symbols in the frame and a frequency interleaver.

The frequency interleaver may randomly interleave data cells received from the cell mapper to provide frequency diversity. In addition, the frequency interleaver may operate on data corresponding to an OFDM symbol pair including two sequential OFDM symbols or an OFDM symbol using a different interleaving-seed order to obtain maximum interleaving gain in a single frame.

The OFDM generation block 1030 modulates OFDM carriers by cells produced by the frame building block, inserts pilots, and produces a time domain signal for transmission. In addition, this block subsequently inserts guard intervals, and applies peak-to-average power ratio (PAPR) reduction processing to produce a final RF signal.

The signaling generation block 1040 may create physical layer signaling information used for an operation of each functional block. Signaling information according to an embodiment of the present invention may include PLS data. The PLS data includes PLS1 data and PLS2 data.

The PLS1 data is a first set of PLS data carried in an FSS symbol in a frame having a fixed size, coding and modulation, which carries basic information about the system in addition to the parameters needed to decode the PLS2 data. The PLS1 data provides basic transmission parameters including parameters required to enable reception and decoding of the P LS2 data. In addition, the PLS1 data remains constant for the duration of a frame group. The PLS2 data is a second set of PLS data transmitted in a n FSS symbol, which carries more detailed PLS data about the system and the DPs. The PLS2 contains parameters that provide sufficient information f or the receiver to decode a desired DP. The PLS2 signaling further include s two types of parameters, PLS2 static data (PLS2-STAT data) and PLS2 dynamic data (PLS2-DYN data). The PLS2 static data is PLS2 data that remains static for the duration of a frame group and the PLS2 dynamic data is P LS2 data that dynamically changes frame by frame.

PLS2 data can include FIC_flag information. FIC (fast information channel) is a dedicated channel for carrying cross-layer information to en able fast service acquisition and channel scanning. FIC_FLAG is a 1-bit field and indicates whether the FIC is used in a current frame. If this field is set to '1', the FIC is provided in the current frame. If this field set to '0', the F IC is not carried in the current frame. The BICM block 1010 may include BI CM block for protection of the PLS data including a PLS FEC encoder, a bit interleaver and a constellation mapper.

The PLS FEC encoder may include a scrambler for scrambling PLS1 data and PLS2 data, a BCH encoding/zero insertion block for outer encoding on the scrambled PLS 1,2 data using a shortened BCH code for P LS protection, and insert zero bits after BCH encoding, an LDPC encoding block for LDPC encoding using an LDPC code and an LDPC parity puncturing block. The bit interleaver may interleave each of shortened and punctured PLS1 data and PLS2 data. The constellation mapper may map the bit-interleaved PLS1 data and PLS2 data to constellations.

The broadcast signal reception apparatus for future broadcast services according to the embodiment of the present invention may correspond to the broadcast signal transmission apparatus for future broadcast services described with reference to FIG. 8.

The broadcast signal reception apparatus for future broadcast services according to the embodiment of the present invention may include a synchronization & demodulation module carrying out demodulation corresponding to a reverse procedure of a procedure performed by the broadcast signal transmission apparatus, a frame parsing module parsing input signal frames and extracting data through which a service selected by a user is transmitted, a demapping & decoding module which convert input signals into bit do main data and then deinterleave the same as necessary, perform demapping of mapping applied for transmission efficiency and correct an error generated on a transmission channel through decoding, an output processor performing reverse procedures of various compression/signal processing procedures which are applied by the broadcast signal transmission apparatus and a signaling decoding module obtaining PLS information from a signal demodulated by the synchronization & demodulation module. The frame parsing module, the demapping & decoding module and the output processor may execute functions thereof using data output from the signaling decoding module.

According to an embodiment of the present invention, each TI group is either mapped directly to one frame or spread over $P_I$ frames. Each TI group is also divided into more than one TI block ($N_{TI}$), where each TI block corresponds to one usage of a time interleaver memory. The TI blocks within the TI group may contain slightly different numbers of XFECBLOCKs. Typically, the time interleaver may also function as a buffer for DP data prior to a process of frame building.

The Time interleaving according to an embodiment of the present invention is a twisted row-column block interleaver. The twisted row-column block interleaver according to an embodiment of the present invention may column-wise write a first XFECBLOCK into a first column of a TI memory, and a second XFECBLOCK into a next column, and so on). Then, in an interleaving array, cells are diagonal-wise read diagonal-wise from a first row (rightwards along a row beginning with a left-most column) to a last row, $N_r$, cells are read out. Moreover, in order to achieve single-memory deinterleaving at a receiver side regardless of a number of XFECBLOCKs in a TI block the twisted row-column block interleaver may insert the virtual XFEC-BLOCKs in to the TI memory. The virtual XFECBLOCKs must be inserted infront of other FECBLOCKS to achieve single-memory deinterleaving at a receiver side.

Figure 9:
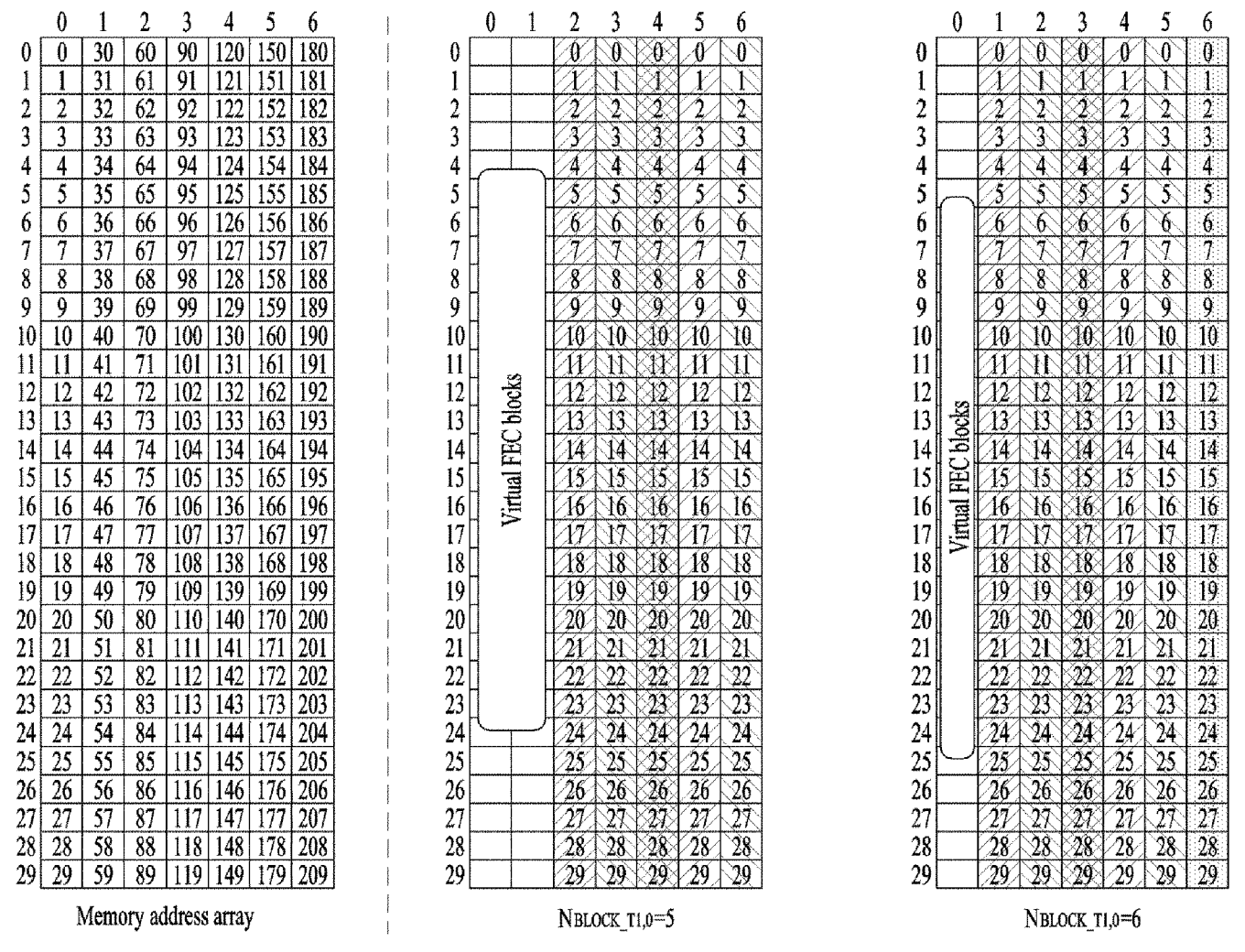

FIG. 9 illustrates a write operation of a time interleaver according to an embodiment of the present invention.

A left block in the figure illustrates a TI memory address array, and right blocks in the figure illustrate a write operation when two virtual FEC blocks and one virtual FEC block are inserted into heads of two contiguous TI groups, respectively.

The frequency interleaver according to the present embodiment may include an interleaving address generator for generating an interleaving address for applying corresponding data to a symbol pair.

FIG. 10 illustrates an interleaving address generator including a main pseudo-random binary sequence (PRBS) generator and a sub-PRBS generator according to each FFT mode which are included in a frequency interleaver according to an embodiment of the present invention.

(a) shows the block diagrams of the interleaving-address generator for 8K FFT mode, (b) shows the block diagrams of the interleaving-address generator for 16K FFT mode and (c) shows the block diagrams of the interleaving-address generator for 32K FFT mode.

The interleaving process for the OFDM symbol pair is described as follows, exploiting a single interleaving-sequence. First, available data cells (the output cells from the Cell Mapper) to be interleaved in one OFDM symbol $O_{m,l}$ is defined as $O_{m,l}=[x_{m,l,0}, \ldots, x_{m,l,p}, \ldots, x_{m,l,Ndata-1}]$ for $l=0, \ldots, N_{sym-1}$, where $x_{m,l,p}$ is the $p^{th}$ cell of the $l^{th}$ OFDM symbol in the $m^{th}$ frame and $N_{data}$ is the number of data cells: $N_{data}=C_{FSS}$ for the frame signaling symbol(s), $N_{data}=C_{data}$ for the normal data, and $N_{data}=C_{FES}$ for the frame edge symbol. In addition, the interleaved data cells are defined as $P_{m,l}=[v_{m,l,0}, \ldots, v_{m,l,Ndata-1}]$ for $l=0, \ldots, N_{sym}-1$.

For the OFDM symbol pair, the interleaved OFDM symbol pair is given by $v_{m,l,Hi(p)}=x_{m,l,p}$, $p=0, \ldots, N_{data}-1$, for the first OFDM symbol of each pair $v_{m,l,p}=x_{m,l,Hi(p)}$, $p=0, \ldots, N_{data}-1$ for the second OFDM symbol of each pair, where $H_l(p)$ is the interleaving address generated based on a PRBS generator and a cyclic shift value (symbol offset) of a sub-PRBS generator.

Hereinafter, a structure of an emergency alert system for providing a concept of an emergency alert (EA) and the emergency alert according to an embodiment of the present invention will be described.

In the event of an emergency situation that needs to issue the emergency alert (EA) over a broadcast network, a broadcast needs to transfer emergency information to a broadcast receiver (e.g., a TV receiver). As the emergency information, various types of information for notifying that the emergency situation occurs may be provided. For example, a type of emergency information may include at least one of an EA wakeup bit, an open EA message, a closed EA message, an EA application (EAA), a rich media file, and an EA related programming. In the present specification, the emergency information may be referred to as EA information.

Even when the broadcast receiver is in a standby mode, the EA wakeup bit/information may be bit/information that allows a viewer to recognize that the emergency situation occurs. As an example, the EA wakeup bit may be information of 2 bits included in a bootstrap of a physical layer frame (signal frame).

When the broadcast receiver capable of supporting a wakeup function is activated to decode to display a picture, the broadcast receiver may monitor an RF signal and check PHY bootstrap signaling for the EA wakeup bit. If the EA wakeup bit in the bootstrap indicates a new or updated emergency situation, the broadcast receiver may be woken up and process the EA information.

The open EA message may be an open or burned-in message burned and provided to an audio and/or video of a broadcast service. Such an open EA message may have a priority on a screen.

As an example, the open EA message may be generally an emergency alert system (EAS) message broadcasted while being burned-in to the audio and the video of the broadcast service. In this case, each EAS message burned-in to the audio/video may start with an audio tone for notifying the presence thereof. Followed by text overlaid on the video, such as a static or scroll banner, and audio replacing program audio in a secondary audio channel or in an audio track. As an example, the total duration of the EAS message may generally be less than two minutes. In the present specification, the open EA message may be referred to as an open EA display, a burned-in message, a burned-in banner message, an EAS message, or the like.

The closed EA message may be a closed message provided while being formatted in a predefined EA related message. The closed EA message may be needed for persistence and detail.

As an example, the closed EA message may be a common alert protocol (CAP) message formatted in a CAP message format or an advanced emergency alert (AEA) message formatted in an AEA message format, which is a newly defined message format suitable for a broadcast system. In the present specification, the closed EA message may be referred to as a closed EA display, a CAP message, an AEA message, or the like. Further, in the present specification, the EA message may be used as a concept including the open EA message and the closed EA message.

As an example, the closed EA message may be transmitted while being included in a message table. For example, the AEA message may be transmitted while being included in an AEAT table/information. In this case, one message table may include one or more EA messages.

The EA application (EAA) may be a broadcaster application for providing additional information including emergency information. Further, the rich media file may be a content file that provides the additional information for the emergency alert. As an example, the rich media file may be referenced from the closed EA message, such as the AEA message or may be a resource used by the EAA. Further, EA related programming may be programming (e.g., local news coverage) that provides the viewer with information regarding an ongoing emergency situation.

The EA information needs to be broadcast promptly and provided to a user in the emergency situation. Therefore, the EA information may be transmitted in a different path from normal service data. In the broadcast system, the EA information may be transmitted using a dedicated channel for the EA information or a specific PLP. However, in this case, data/a signal needs to be processed and inserted in the physical layer, which make it difficult to operate the system for the EA information. Therefore, a method for transmitting the EA information using a UDP/IP packet will be described below.

The EA information may be transmitted in IP packets instead of being transmitted as link layer signaling or physical layer channel/data. In particular, in the IP-based broadcast system described above, the IP-based EA information may have an effect of facilitating the system operation. To this end, additional signaling information indicating to which IP packet the EA information is transferred may be configured. As an example, whether the EA information is included may be represented by using a header part of the packet.

FIG. 11 illustrates an EA system according to an embodiment of the present invention. More specifically, FIG. 11 illustrates a method in which a broadcast transmitter transmits EA information and a broadcast receiver obtains the EA information in a next generation broadcast system. In FIG. 11, it is assumed that a thin solid line represents the flow of the EA application, a thin dotted line represents the flow of the CAP message, a bold solid line represents the flow of the AEA message, and a thick dotted line represents the flow of the EAS message.

Referring to FIG. 11, when an emergency situation occurs in which the emergency information needs to be transmitted through the broadcast network, an EA authority may notify an EA event to a broadcaster by means of the CAP message. However, according to an embodiment, a notification method other than the CAP message may be used.

Then, the broadcaster may receive and process the CAP message. As an example, based on the selection of the broadcaster, any given CAP message may be ignored or provided to the public after being processed within a broadcast program content. As an example, some CAP messages may be discarded by the broadcaster because the CAP messages are not significant enough to interfere with a normal program. Other CAP messages (others) may be discarded because severity is low enough, or an affected area is small or the other CAP messages get out of broadcast coverage.

If the broadcaster decides to distribute contents of a particular incoming CAP message, after editing the contents, the edged contents may be included in a broadcast multiplex (as the AEA message of the broadcaster of FIG. 11). As an example, a text of the AEA message may be edited in a broadcaster plant before being forwarded to the viewer, for example, to delete only a portion associated only with a first responder or agency. The broadcaster may also have an option to add rich media elements such as graphics or multimedia (e.g., video or audio clips).

The incoming AEA message may also be transferred to an "EA application generator" and the generator may generate a broadcaster application (or contents for the existing application) to be used and distributed by an application runtime environment in a broadcast receiver (e.g., an ATSC 3.0 receiver) in order to provide an interaction experience related to the emergency situation.

The broadcast receiver may include audio/video rendering and may support a runtime application environment (e.g., an ATSC 3.0 runtime application environment). As illustrated, depending on formats of URLs referencing the EA content, the rich media file may provide access to an EA web server through a broadband or provided through a broadcast delivery.

Application signaling may cause an application resource such as a media file that is usable by an application to be distributed. The URLs in the AEA message referencing rich media may be resolved by either a broadcast or a broadband path, depending on the selection of the broadcaster for file distribution.

Arrows marked with bold dotted lines may indicate EAS information included (burned) in the video or included in audio program contents.

The processing by the broadcaster may be performed by the broadcast transmitter of the broadcaster. A transfer process of the EA information by the broadcast transmitter and the broadcast receiver is again summarized as follows.

First, the broadcast transmitter may receive the EA message such as the CAP message and processes the received EA message. For example, the broadcast transmitter may convert the received CAP message into the AEA message. In this case, the broadcast transmitter may delete/modify information or contents in the CAP message or insert additional information or contents into the AEA message. Thus, the AEA message processed by the broadcast transmitter may include information/content modified or added by the broadcaster. In addition, the broadcast transmitter may burn text (banner text) in the video of a broadcasting service or add secondary audio by using the information or the like in the CAP message. Thus, the broadcast transmitter may generate the EAS message from the CAP message.

The EA information/data thus generated may be processed according to a purpose and the format of each EA, and transmitted to a broadcasting network through the physical layer pipe (PLP) or to a broadband network. For example, one or more generated AEA messages may be transmitted while being included in the AEAT table. In this case, the AEAT table may be transferred while being included in the LLS information.

Thereafter, the broadcast receiver may acquire and parse the AEAT. In an embodiment, the broadcast receiver may autonomously provide the emergency alert to the viewer based on the information in the AEA message. In another embodiment, the broadcast receiver may obtain path information for a broadcast service including a burned-in message or secondary audio based on the information in the AEA message and provide video or secondary audio including the burned-in message to the viewer by using the obtained path information. In yet another embodiment, the broadcast receiver may obtain information (e.g., uniform resource identifier (URI) information) regarding the rich media file transferred over broadband or broadcast based on the information in the AEA message and obtain the rich media contents through the broadband or broadcast by using the obtained information and provide the obtained rich media contents to the viewer. In this case, when the rich media file is transmitted through the broadcast, the URI information may be a relative URL indicating a relative path. Alternatively, when the rich media file is transmitted through the broadband, the URI information may be an absolute URL indicating an absolute path.

Hereinafter, a method for signaling the open EA message by the broadcast receiver will be described. As described above, the open EA message as a message that is burned in the video and/or audio may be referred to as a burned-in message, a burned-in banner message, or the EAS message.

As an example, the burned-in message signaling information may be provided via the extension of the CAP message. This will be described below with reference to FIGS. 12 and 14. Alternatively, the burned-in message signaling information may be provided via a separate message. This will be described below with reference to FIGS. 17 and 19. Alternatively, the burned-in message signaling information may be provided through the information in the AEA message which is a new message format. This will be described below with reference to FIG. 18, etc.

As an example, the burned-in message signaling information as various signaling information related to the burned-in message may include, for example, information regarding the presence or absence of the burned-in message, information regarding the duration of the burned-in message, information regarding screen clear for providing the burned-in message, and the like. In the present specification, the burned-in message signaling information may be referred to as the burned-in information or the like.

FIG. 12 illustrates extension of a CAP message for providing burned-in information according to an embodiment of the present invention.

As described above, the CAP message may be an EA message generated by the EA authority and transmitted to the broadcaster. Such a CAP message may not include information sufficient for the broadcaster to use the CAP message to provide the EA information. Accordingly, the broadcaster may provide desired EA information through the extension of the CAP message. The extension of such a CAP message may be performed using a parameter element in the CAP message. As an example, the parameter element may be included in an info element in an alert element of the CAP message.

Referring to FIG. 12, the parameter element of the CAP message may be used for the extension to the burned-in message (e.g., a burned-in banner). This parameter element may be used as an indicator of the burned-in banner. For example, as illustrated, value name information of the parameter element may be set to "burned", value information may be set to indicate a "true" value if the banner is burned in and set to indicate a "false" value if the banner is not burned in to use the parameter element as an indicator/flag indicating whether there is the burned-in banner.

In summary, if the value of the value information is "TRUE" (or a first value) in the parameter element having "burned" as the value of the value name information, the value information may indicate that there is the burned-in message (banner) and if the value of the value information is "false" (or a second value), the value information may indicate that there is no burned-in message. The broadcast receiver may provide the burned-in information through the extension of the CAP message of such a scheme.

In addition to the extension of the burned-in information signaling, various CAP messages may be extended in order to provide the EA information suitable for the broadcast service. For example, the CAP message may include one or more info elements and in this case, the CAP message may be extended in order to assign an ID for each info element. With such an info ID, EA related information/messages contained in each information element may be distinguished. Therefore, the info ID may be referred to as an EA-related message ID.

As illustrated, by setting the value name information of the parameter element to "id" or "capInfoId" and setting the value information to indicate an identifier (ID) value of the info element, the CAP message may be extended for the Info ID. In this case, the value of the info ID may be a unique value in the CAP message or a message table (e.g., an EA table (EAT)) including the CAP message. Such an info ID of the CAP message may be mapped to an info ID of S-TSID. In this way, the broadcast receiver may filter and receive only a resource associated with a desired emergency situation. This will be described below with reference to FIG. 13.

FIG. 13 illustrates rich media content signaling delivered to a broadcast network according to an embodiment of the present invention. In the embodiment of FIG. 13, the CAP message is a CAP message extended for providing the info ID and the extension of the CAP message follows the description of FIG. 12. As described above, the CAP message may be referred to as the closed EA message, etc.

Referring to FIG. 13, the CAP message may include a parameter element having "capInfoId" as a value attribute value and "capInfo: 1234" as a value of Value. Thus, an info element including the parameter element may be identified and the EA-related information included in the corresponding info element may be distinguished from the EA-related information included in another info element.

As illustrated, the CAP message and the SLT information may be transmitted through the same PLP (PLP #0). In this case, the SLT information includes service category attribute/information indicating an EAS service. The SLS information referenced by the SLT information includes an S-TSID fragment and the STSID fragment may include "capInfoId" element containing the info ID. As an example, the "capInfoId" element of the S-TSID fragment may be included in the "ContentInfo" element. Here, the "ContentInfo" element may provide information regarding the content carried in the corresponding source flow (SrcFlow) and "capInfoId" may provide identification information that identifies the content information.

As described above, the info ID value of the S-TSID fragment may be mapped to the info ID value of the CAP message. As such, the broadcast transmitter maps the S-TSID fragment and the info ID of the CAP message at the time of transmission of the EA-related resource (rich media resource), thereby filtering and receiving only the rich media resources associated with the emergency situation (for example, a hurricane).

FIG. 14 illustrates extension of a CAP message for providing burned-in information according to another embodiment of the present invention. In FIG. 14, similar to FIG. 12, the burned-in information may be provided using the parameter element of the CAP message. In FIG. 14, a description duplicated with FIG. 12 will be omitted.

As in the embodiment of FIG. 12, in the case of using the burned-in information (burned-in flag) indicating the presence or absence of the burned-in message for the burned-in information signaling, every time the flag value is changed from True to False, the broadcast transmitter needs to update the EA message (e.g., the CAP message) even though there is no new EA related information/data and retransmit the LLS information including the EA message. In this case, each time the burned-in flag is changed, the broadcast receiver needs to determine whether to erase other information on the screen by parsing the LLS information to check whether there is the burned-in message. This results in a waste of resources in the broadcast system. In order to resolve the waste, a new scheme of burned-in information signaling method may be required. This will be described below.

Referring to FIG. 14, the parameter element of the CAP message may include value name information and value information. In this case, in order to provide new type of bundled information, the value name information may be set to "burnInUntil" and the value information may be set to indicate the date and time when the banner is no longer burned in. As an example, it is assumed that if the value information does not indicate a particular date and time, the banner may no longer be burned in at a future undefined time.

As described above, the burned-in information can provide information (duration information) regarding the duration in which the burned-in message is continued. This duration information may be used to indicate that the screen should be kept in a screen clear status for the duration in order to present the burned-in message on the screen. That is, the duration information may be used for indicating the duration of the screen clear status keeping (KeepScreenClear) for an identified service (e.g., a burned-in message providing service). In this case, the duration of the burned-in message may be the same period as the duration of the screen clear status keeping. As an example, a start time of the duration may be a first receiving time of the EA message including the duration information.

FIG. 15 illustrates a method for providing the burned-in information of FIG. 14.

Referring to FIG. 15, the physical layer frame may include one or more PLPs and one of the one or more PLPs may include the EA message. For example, a particular PLP (PLP #0) may include the EA message such as the CAP message. In this case, the particular PLP may be referred to as signaling PLP.

In this case, the EA message may include burned-in period information. For example, as illustrated, the CAP message may include the parameter element in the info element and may provide the burned-in information (duration information) through the extension of the parameter element. The extension of the parameter element for providing the duration information follows FIG. 14.

As described above, the duration information may provide information regarding a period in which the burned-in message is continued. For example, as illustrated, the value information of the parameter element may indicate a date (Mar. 29, 2016) and a period (5 hours from 18:00) in which the burned-in message is continued. According to the embodiment, the duration of the burned-in message may start from the time when the duration information is received. For example, the duration of the burned-in message may start from the time when the EA information including the duration information is received. In this case, the EA information may be transmitted while being included in an LLS table.

Hereinafter, an EA signaling method for resolving a broadcaster's request for clearly keeping the screen when the open EA message is displayed on the screen and using the AEA message instead of the CAP message for the closed EA message and the rich media resource will be described.

Further, two types of signaling of the burned-in message such as the EAS message using the EA signaling method are described. A first type is an EAS signaling method with EAS flag signaling as illustrated in FIG. 17 and a second type is an EAS signaling method with delay timer (Delay_Timer) signaling in the AEA message as illustrated in FIG. 18.

FIG. 16 illustrates an LLS table according to another embodiment of the present invention.

As described with reference to FIG. 3, the LLS table/information may include information according to an LLS_table_id field, a provider_id field, an LLS_table_version field, and/or an LLS_table_id field. As described above, according to the value of the LLS_table_id field, the corresponding LLS table may include one of SLT information, rating region table (RRT) information, SystemTime information, and an EA message (EaMessage) providing information related with the emergency alert.

In this case, the EA message in the embodiment of FIG. 16 may be the AEA message, which is the AEA message format, unlike the embodiment of FIG. 3, which is the CAP message format. Such an AEA message will be described below with reference to FIG. 20.

FIG. 17 illustrates a method for signaling an EAS message using EAS flag information according to an embodiment of the present invention. In the embodiment of FIG. 17, the EAS flag information may be included in the EA message transmitted and included in the LLS table. As described above, the EAS message may be referred to as the open EA message, the burned-in message, etc.

Referring to FIG. 17, the EA message may include the EAS flag information and/or the AEA message. For example, the EA message may include a sequence element and the sequence element may include the EAS flag information and the AEA message. Here, the AEA message may be an EA message formatted into an AEA message format (AEA-MF).

Further, the EAS flag information may include a Boolean value indicating whether the EAS message or the burned-in message is on the screen. That is, the EAS flag information may indicate whether the EAS message or the burned-in message is on the screen. Thus, the burned-in information (e.g., EAS flag information) indicating the presence or absence of the open EA message such as the EAS message may be signaled separately from the closed EA message such as the AEA message. In this case, the EAS flag information and the AEA message may be transmitted while being included in the LLS table.

FIG. 18 illustrates an EAS signaling method using delay timer information according to an embodiment of the present invention. In the embodiment of FIG. 18, the delay timer information may be included in the AEA message in the EA message transmitted and included in the LLS table.

Referring to FIG. 18, the EA message may include the AEA message and the AEA message may include the delay timer information. Here, the delay timer information may indicate a delay time between first reception of the AEA message or the EA message including the delay timer information and the display on the screen. That is, the delay timer information may indicate a delay time between the time of first reception of the AEA message or the EA message including the delay timer information and a time when the corresponding message is displayed on the screen. If this value is 0 or missing, the delay timer information may indicate an immediate operation. That is, if the value is 0 or missing, the delay timer information may indicate that when the AEA message or the EA message is received the corresponding message is immediately displayed.

The delay timer information may have an advantage that an additional table is not required. Further, the delay timer information may have an advantage that an additional studio interface or message routing is not required. Further, the delay timer information may have an advantage that a second message required for counting the burned-in flag information is not required. Further, in the delay timer information, a timing may be related to initial reception so as not to be confused with time zone issues or typos. Further, when the delay timer information is used, processing of the alert and reception of NRT contents may be immediately started while the display waits for the timer.

Hereinafter, an operation of the broadcast system associated with the delay timer information will be described.

First, the broadcasting transmitter side, a studio operator (or software) may set the duration of the burned-in banner/message. In this case, the delay timer may be automatically set so that a digital banner (or the closed EA message) is displayed just before the burned-in banner (or open EA message) disappears. The continuity helps the user understand the cases as one event instead of two separate events.

The delay parameter (delay tinier information) may be added to the alert message before transmission. Further, the receiver may decode the alert message and use a delay parameter for two following functions. First, the broadcast receiver may use the delay parameter to immediately clear a user overlay screen. That is, the delay timer information may be used to clear the screen for a particular service (e.g., an EAS service to provide the EA message such as the burned-in message). Second, the broadcast receiver may use the delay parameter to add the digital banner after the delay period has elapsed.

The closed EA message (digital banner) may continue to be displayed until the closed EA message is released or the alert expires. Further, the closed EA message (digital banner) may be recalled until the closed EA message is released or the alert expires.

Hereinafter, the LLS table associated with the EA signaling and the EAS message will be described. In particular, the keep clear flag (KCF) information and the AEA message format will be described in detail below.

The KCF information may activate a signaling mechanism to prevent the broadcast contents from blurring due to a display in which graphics are overlaid at the receiver at the discretion of the broadcaster. In the present specification, the KCF information may be referred to as burned-in signaling information.

The AEA message format may be used in place of the CAP message for rich media resources for the closed EA message and the AEA message.

FIG. 19 illustrates an LLS table according to yet another embodiment of the present invention. In contrast to FIGS. 3 and 16, in the embodiment of FIG. 19, the LLS table may include two separate LLS tables/messages, with respect to the EA. For example, the LLS table may include one LLS message for the KCF information and another LLS message for the AEA message format. According to the embodiment, either of the two LLS messages may be absent.

As described in FIGS. 3 and 16, the LLS table/information may include information according to the LLS_table_id field, the provider_id field, the LLS_table_version field, and/or the LLS_table_id field. Referring to FIG. 19, according to the value of the LLS_table_id field, the corresponding LLS table may include one of SLT information, rating region table (RRT) information, SystemTime information, AEAT information providing information related to the emergency alert, and the KCF table/information providing information related with the screen clear.

In this case, the AEAT information may be EA table/information including one or more AEA messages. The AEA message included in the AEAT information will be described below with reference to FIG. 20.

FIG. 20 illustrates AEAT information according to an embodiment of the present invention.

The AEAT information may be one of the instance types of the LLS table/information. The AEAT information may include one or more AEA messages. The AEA message may be formatted as the AEA message format.

The AEA message format may be for providing the digital message/banner for emergency message transmission. The AEA message format may be in a specific format for delivering all-hazard emergency alerts and general alerts via the broadcast system (e.g., ATSC 3.0 system). Further, the AEA message format may be extended and have a sufficient size to accommodate a content alert message format. Further, the AEA message format allows a warning message to be propagated to the receiver in a consistent manner. Further, the AEA message format is XML-based and may be widely used in broadcast, cable, and IPTV environments. Further, the AEA message format may include a function for multimedia contents which may be transferred by an alert generator or the broadcaster itself.

Referring to FIG. 20, the AEAT information may include one or more AEA messages. The AEA message may include one Header element, one or more AEA text elements, and zero or more Media elements.

As an example, the AEA message may include an AEA ID attribute (@aeaId) indicating the ID of the AEA message, an audience attribute (@audience) indicating the intended distribution of the AEA message, an AEA type attribute (@aeaType) indicating the category of the AEA message, a reference AEA ID attribute (@referenceAeaId) indicating the referenced ID of the AEA message, a priority attribute (@priority) indicating the priority of the AEA message, or a delay timer attribute (@delayTimer) indicating a delay time between the initial reception of the AEA message and the display on the screen.

As described with reference to FIGS. 12 and 13, the ID value of the AEA ID attribute may be mapped to the ID value of the content info element of the S-TSID fragment of the SLS information and used for filtering of the AEA resource associated with the desired emergency situation.

Further, as described with reference to FIG. 18, the delay timer attribute/information may indicate a delay time between a valid time of the AEA message and the time when the receiver overlays the AEA related graphic. The delay timer information may be used together with the KCF information to be described later or may be used in place of the KCF information.

In addition, the priority attribute may be used to determine which message the broadcast receiver should prefer to display on the screen, if the AEAT information includes a plurality of AEA messages. For example, when the AEAT information transmits the plurality of AEA messages, if there is no priority information for each AEA message, the receiver may not determine from which message to display on the screen. In this case, the receiver may perform a scheme of displaying the AEA message in the form of the banner on the screen in the order of the AEAT information regardless of the importance of the AEA message or the like. However, if the AEAT information includes the priority information, the broadcast receiver may provide the AEA message to the user in a desired order considering the priority of the AEA message.

The header element of the AEA message may be a container for a default alert envelope. As an example, the header element may include at least one of an effective time attribute (@effective) indicating an effective time of the AEA message, an expiration time attribute (@expires) indicating an expiration time of the AEA message, an event code element (EventCode) which is a code for identifying an event type of the AEA message, and a location element (Location) which is a geocode indicating an area effected by the AEA message. In this case, the event code element may include a type attribute (@type) indicating a national-assigned string designating a domain of a code. Further, the location element may include a type attribute (@type) indicating a national-assigned string designating a domain of a code.

The AEA text element of the AEA message may include a specific text of an emergency notification. As an example, the AEA text element may include a language attribute (@lang) including a code indicating a language of each element of an alert text.

The media element of the AEA message may include a component part of the multimedia resource. As an example, the media element may include at least one of a language attribute (@lang) containing a code representing the language of each media element or a media URI attribute (@mediaUri) indicating the ID of a media file, a media description element (MediaDesc) including a text for describing contents and types of the media file text describing the contents of the media file and the type of media file, and a MediaDerefUri element indicating mimetype data contents of the media file. In this case, the media description element may include a language attribute (@lang) including a code indicating the language of each media description element.

FIG. 21 illustrates KCF information according to an embodiment of the present invention.

As described above, the KCF information may activate a signaling mechanism (e.g., used when the open EA message is displayed on the screen) to prevent broadcast contents from blurring into the display in which the graphics are overlaid at the receiver at the discretion of the broadcaster. In other words, the KCF information may instruct the receiver to prevent some parts (e.g., important text/visual information, including visually embedded EA-related information in the video) of a video image at the receiver from blurring.

In general, when the KCF information is set to "true", the KCF information may mean that the broadcaster is sending arbitrary information on the screen. When the KCF information does not exist, the KCF information should be interpreted as "False". When both the KCF information and the delay timer attribute are present, only one may indicate whether to wish to keep the screen clear of the broadcaster-generated graphics overlay, and a receiver operation may be determined by the receiver implementation. However, if both fields indicate that there is no need to eliminate the graphic overlay, it may be reasonable to expect that the receiver will only render the graphic overlay.

Referring to FIG. 21, the KCF information/table may include at least one of a BSID attribute (@bsid), a flag attribute (@flag), a service ID attribute (@serviceId), a service ID range attribute (@serviceIdRange), and a version attribute (@version).

The KCF information may be a root element of a KCF LLS table fragment. That is, the KCF information may be the root element of the KCF. The KCF information may include broadcaster information and service information for on-screen information (e.g., on-screen text/visual information) that includes EA related information. Further, the KCF information may carry information on services related to keep screen clear status corresponding to on-screen critical information. Therefore, in the present specification, the KCF information may be referred to as KeepScreenClear information or screen clear information or the like.

A BSID attribute may indicate an identifier of an entire broadcast stream. As an example, the BSID attribute may be a 16-bit integer indicating the BSID of the broadcast stream associated with the value of the service ID attribute indicated in the corresponding KCF information. As an example, the value of the BSID attribute may be a value that is unique at a local level. A management or regulatory authority may perform such a role.

The flag attribute may indicate a status of the KCF information. As an example, the flag attribute may be a Bloolean flag of the KCF information. Specifically, the flag attribute may indicate the status of the KCF information for the identified service for the identified broadcast stream. If the value of the flag attribute is true, the flag attribute may mean that the broadcaster would like to suppress the receiver-generated graphic overlay. If the KCF information does not exist, a default value of the flag attribute may be false.

The version attribute may indicate the version of the KCF information. As an example, each time any data in the KCF information is changed, the value of the version information may be incremented by one.

The version information may also be provided so that the viewer may release the given KCF information and resume use of the display graphic overlay if necessary. The version information allows the receiver to distinguish the KCF information that is released by the viewer and new KCF information from each other. For example, if a reason for maintaining the screen clearing is changed, a version number will be increased, so that the receiver may distinguish one KCF information from another KCF information, and the receiver may release the given KCF information and receive subsequent different KCF information. The extent of uniqueness of the version attribute can be determined by the broadcaster. In the present specification, the version information may be referred to as a KCF version or KCF version information.

The service ID attribute may represent an ID list of one or more services within the range of the broadcast stream to which the KCF information is applied. If the service ID attribute does not exist, the KCF information may be applied to all services in the broadcast stream identified by the BSID attribute. When a plurality of services is included, IDs of the services may be divided into spaces.

The service ID range attribute may indicate a range of the service ID attribute to which the KCF information is applied. As an example, the service ID range attribute may be an 8-bit value for indicating the range of the service ID attribute to which the KCF information is applied. If the service ID attribute exists and the service ID range attribute does not exist, the service ID range attribute needs to be set to 0.

As in the embodiment of FIG. 21, when the broadcast transmitter transmits information related to the screen clear status keeping in the EA message but transmits the information related with the screen clear status keeping using the message/information separate from the EA message, it is possible to provide the instruction for keeping the screen clear status for various services to the broadcast receiver. In other words, the broadcast transmitter may provide the broadcast receiver with the instruction for the screen clear status keeping for other services including important on-screen information in addition to the EAS service.

FIG. 22 illustrates a method for transmitting a broadcast signal according to an embodiment of the present invention.

The broadcast transmitter may generate low level signaling (LLS) information (S22010). An LLS information/table as a signaling transmitted at an IP level is described in FIGS. 3, 16, and 19.

As an example, the LLS information may include LLS ID information that identifies the type of LLS information. The LLS ID information may also be referred to as LLS table ID information.

As an example, the type of LLS information may include at least one of EA information providing information related to the emergency alert or screen clear information providing information related to the screen clear. As described above, the screen clear information may be referred to as KCF information, OnscreenMessageNotification information, or the like. The EA information and the screen clear information are described below with reference to FIGS. 11 to 21.

As an example, the screen clear information may include version information which indicates the version of the screen clear information. Further, the screen clear information may further include includes at least one of BSID information indicating ID of a broadcast stream, service ID information indicating ID of a service in a range of a broadcast stream which is related to the screen clear information, service ID range information indicating the range of the service ID information which is related to the screen clear information, and flag information indicating a status of the screen clear information.

As an example, the LLS information may include duration information which is used for indicating duration of the screen clear status. Here, the duration information may be the above-described delay timer or delay parameter. In this case, the duration information may be included in at least one of the EA information and the screen clear information.

The broadcast transmitter may encapsulate the LLS information into an Internet protocol (IP) packet (S22040). The IP packet containing the LLS information may be identified by an IP address and a port number. Therefore, data transmitted by the broadcast transmitter according to the present invention may be operated/identified based on the IP.

In this case, the IP packet containing the LLS information may have a predetermined IP address. That is, the LLS information may be carried as a payload of an IP packet having a well-known address (e.g., 224.0.23.60) and a port number (4937). Thus, the receiver may quickly obtain the LLS information using the IP address.

The broadcast transmitter may generate a signal frame by physical layer processing the LLS information (S22050). This is described above with reference to FIGS. 8 to 10. Further, a broadcast signal transmitter may further perform link layer processing of the LLS information between the IP encapsulating (S22040) and the physical layer processing (S22050).

FIG. 23 illustrates a broadcast signal transmitter and a broadcast signal receiver according to an embodiment of the present invention. In FIG. 23, a description duplicated with FIG. 22 will be omitted.

A broadcast signal transmitter 23100 may include a signaling generator 23110, an IP encapsulator 23120, and a physical layer processor 23130.

The signaling generator 23110 may generate the LLS information. In the present specification, the signaling generator may be referred to as a signaling information generating module.

As an example, the LLS information may include LLS ID information that identifies the type of LLS information. The LLS ID information may also be referred to as LLS table ID information.

As an example, the type of LLS information may include at least one of EA information providing information related to the emergency alert or screen clear information providing information related to the screen clear. The EA information and the screen clear information are described below with reference to FIGS. 11 to 21.

As an example, the screen clear information may include version information which indicates the version of the screen clear information. Further, the screen clear information may further include includes at least one of BSID information indicating ID of a broadcast stream, service ID information indicating ID of a service in a range of a broadcast stream which is related to the screen clear information, service ID range information indicating the range of the service ID information which is related to the screen clear information, and flag information indicating a status of the screen clear information.

As an example, the LLS information may include duration information which is used for indicating duration of the screen clear status. Here, the duration information may be the above-described delay timer or delay parameter. In this case, the duration information may be included in the EA information or the screen clear information.

The IP encapsulator 23120 may IP-encapsulate the LLS information. In the present specification, the IP encapsulator may be referred to as an IP processor, an IP packetizer, or a network layer processor.

The physical layer processor 23130 may generate the signal frame by physical layer processing the LLS information. This is described above with reference to FIGS. 8 to 10.

The broadcast signal transmitter 23100 of FIG. 23 performs the broadcast signal transmission method described above and the same description is not duplicated. Further, the broadcast signal transmitter 23100 may further include a link layer processor (not illustrated). The link layer processor may link layer process the LLS information between the IP/UDP encapsulator 23120 and the physical layer processor 23130.

The broadcast signal receiver 23200 may include a signaling parser 23210, an IP packet parser 23220, and a physical layer parser 23230. The broadcast signal receiver 23200 may perform a reverse operation of the broadcast signal transmitter.

The physical layer parser 23230 may physical layer process the received signal frame. In this case, the signal frame may include the LLS information. The IP packet parser 23220 may filter a specific IP packet stream from a received IP packet stream. For example, the IP packet parser 23220 may selectively output the IP packet stream including the LLS information. In this case, the IP packet parser 23220 may output the IP packet stream having the well-known IP address described above as the IP packet stream including the LLS information. The signaling parser 23210 may obtain and parse the signaling information, such as the LLS information and control the operation of the broadcast signal receiver based thereon.

For example, the broadcast signal receiver obtains the LLS information and parses the LLS information to obtain the screen clear information. In addition, the broadcast signal receiver may obtain information regarding whether to clear the screen for the critical onscreen information (e.g., burned-in message), information regarding the duration of the screen clear keeping, and the like, based on the screen clear information. The broadcast signal receiver may perform an operation based thereon.

Further, the broadcast signal receive 23200 may further include a link layer parser (not illustrated). The link layer parser may perform link layer processing (parsing) between the physical layer parser 23230 and the IP/UDP packet parser 23220. In this way, the link layer parser may output the link layer signaling or the IP packet stream.

The broadcast signal receiving method by the broadcast signal receiver 23200 according to an embodiment of the present invention will be summarized as below. The broadcast signal receiver 23200 may receive a broadcast signal including at least one signal frame (physical layer frame). Here, the signal frame may include the LLS information/table. The LLS information is as described above.

Next, the broadcast signal receiver 23200 may obtain the LLS information. Thereafter, the broadcast signal receiver 23200 may perform various operations based on the LLS information. For example, when the LLS information includes the above-described duration information, the broadcast signal receiver 23200 may determine the duration of the screen clear status based on the duration information and keep the screen in the clear status for the duration. Accordingly, the broadcast signal receiver 23200 may provide the user with an EA-related burned-in message or the like, during a screen clear status keeping period.

As another example, when the LLS information includes the above-described screen clear information, the broadcast signal receiver 23200 may determine whether to keep the screen in the clear status based on the screen clear information. In this case, if the screen clear information includes the version information, the broadcast signal receiver 23200 may identify current screen clear information and the previous screen information using the version information.

In FIG. 23, subunits of the broadcast signal transmitter and the broadcast signal receiver are classified according to their operations. That is, one subunit does not have to be implemented as one physical processor, and one subunit may be implemented by a plurality of physical processors, or a plurality of subunits may be implemented by one physical processor.

Each of the steps described in the above embodiments may be performed by hardware/processors. Each module/block/unit described in the above embodiments may operate as the hardware/processor. Further, the methods proposed by the present invention may be executed as the codes. The code may be written to a storage medium readable by the processor, and thus readable by a processor provided by the apparatus.

Although the drawings have been described for the sake of convenience of explanation, it is also possible to design a new embodiment to be implemented by merging the embodiments described in each drawing. Configurations and methods of the described embodiments may not be limitedly applied to the apparatus and the method according to the present invention, but all or some of the respective embodiments may be selectively combined and configured so as to be variously modified.

Meanwhile, the method proposed by the present invention may be implemented as a processor readable code in a processor readable recording medium provided in a network device. The processor readable recording medium includes all kinds of recording devices storing data which may be deciphered by a processor. Examples of the processor readable recording medium include a ROM, a RAM, a CD-ROM, a magnetic tape, a floppy disk, an optical data storage device, and the like and further include a device implemented as a type of a carrier wave such as transmission through the Internet. Further, the processor readable recording media may be stored and executed as codes which may be distributed in the computer system connected through a network and read by the processor in a distribution method.

Further, although the embodiments of the present invention have been illustrated and described above, the present invention is not limited to the aforementioned specific embodiments, various modifications may be made by a person with ordinary skill in the technical field to which the present invention pertains without departing from the subject matters of the present invention that are claimed in the claims, and these modifications should not be appreciated individually from the technical spirit or prospect of the present invention.

It will be understood by those skilled in the art that various changes and modifications can be made therein without departing from the spirit or scope of the invention. Accordingly, it is intended that the present invention cover the modifications and variations of the present invention provided they come within the scope of the appended claims and their equivalents.

In the present specification, all apparatus and method inventions are herein mentioned and descriptions of both apparatus and method inventions can be supplemented and applied to each other.

MODE FOR INVENTION

Various embodiments are described in a best mode for carrying out the present invention.

INDUSTRIAL APPLICABILITY

The present invention is used in a series of broadcast signal transmission/reception fields.

It will be apparent to those skilled in the art that various changes and modifications can be made therein without departing from the spirit or scope of the invention. Accordingly, it is intended that the present invention cover the modifications and variations of the present invention provided they come within the scope of the appended claims and their equivalents.

The invention claimed is:

1. A method of transmitting a broadcast signal by a transmission apparatus, the method comprising:
processing broadcast service data based on a delivery protocol, the delivery protocol corresponding to a Real-Time Object Delivery over Unidirectional Transport (ROUTE) protocol or an MPEG Media Transport (MMT) protocol;
generating low level signaling (LLS) information;
encapsulating the LLS information and the broadcast service data into packets; and
generating the broadcast signal by physical layer processing the packets,
wherein the LLS information is carried in a physical layer pipe (PLP) in the broadcast signal,
wherein the LLS information comprises information for identifying a type of the LLS information,
wherein the LLS information further comprises screen clear information for providing information regarding keep screen clear status to avoid obscuring any part of video images,
wherein the screen clear information includes version information for indicating a version of the screen clear information and broadcast stream identification information for identifying a broadcast stream which is related to the screen clear information, and
wherein the broadcast signal further includes physical layer signaling information that includes flag information for indicating whether a current PLP carries the LLS information.

2. The method according to claim 1, wherein the screen clear information further comprises at least one of service identification information for identifying a service in a scope of the broadcast stream that the screen clear information applies to, service identification range information for identifying a range of the service identification information that the screen clear information applies to, and information for indicating a status of the screen clear information.

3. The method according to claim 2, wherein, when the service identification information is not present, the screen clear information is applied to all services within the broadcast stream identified by the broadcast stream identification information.

4. A transmission apparatus for transmitting a broadcast signal, the transmission apparatus comprising:
a processor to process broadcast service data based on a delivery protocol, the delivery protocol corresponding to a Real-Time Object Delivery over Unidirectional Transport (ROUTE) protocol or an MPEG Media Transport (MMT) protocol and generate low level signaling (LLS) information;
an encapsulator to encapsulate the LLS information and the broadcast service data into packets; and
a physical layer processor to generate the broadcast signal by physical layer processing the packets,
wherein the LLS information is carried in a physical layer pipe (PLP) in the broadcast signal,
wherein the LLS information comprises information for identifying a type of the LLS information,
wherein the LLS information further comprises screen clear information for providing information regarding keep screen clear status to avoid obscuring any part of video images,
wherein the screen clear information comprises version information for indicating a version of the screen clear information and broadcast stream identification information for identifying a broadcast stream which is related to the screen clear information, and
wherein the broadcast signal further includes physical layer signaling information that includes flag information for indicating whether a current PLP carries the LLS information.

5. The transmission apparatus according to claim 4, wherein the screen clear information further comprises at least one of service identification information for identifying a service in a scope of the broadcast stream that the screen clear information applies to, service identification range information for identifying a range of the service identification information that the screen clear information applies to, and flag information for indicating a status of the screen clear information.

6. The transmission apparatus according to claim 5, wherein, when the service identification information is not present, the screen clear information is applied to all services within the broadcast stream identified by the broadcast stream identification information.

7. A method of receiving a broadcast signal by a reception apparatus, the method comprising:
receiving the broadcast signal including broadcast service data and low level signaling (LLS) information, wherein the broadcast service data are delivered based on a delivery protocol, the delivery protocol corresponding to a Real-Time Object Delivery over Unidirectional Transport (ROUTE) protocol or an MPEG Media Transport (MMT) protocol; and
parsing the LLS information from the broadcast signal;
wherein the LLS information is carried in a physical layer pipe (PLP) in the broadcast signal,
wherein the LLS information comprises information for identifying a type of the LLS information,
wherein the LLS information further comprises screen clear information for providing information regarding keep screen clear status to avoid obscuring any part of video images,
wherein the screen clear information includes version information for indicating a version of the screen clear information and broadcast stream identification information for identifying a broadcast stream which is related to the screen clear information, and
wherein the broadcast signal further includes physical layer signaling information that includes flag information for indicating whether a current PLP carries the LLS information.

8. The method according to claim 7, wherein the screen clear information further comprises at least one of service identification information for identifying a service in a scope of the broadcast stream that the screen clear information applies to, service identification range information for identifying a range of the service identification information that the screen clear information applies to, and information for indicating a status of the screen clear information.

9. The method according to claim 8, wherein, when the service identification information is not present, the screen clear information is applied to all services within the broadcast stream identified by the broadcast stream identification information.

10. A reception apparatus for receiving a broadcast signal, the reception apparatus comprising:
a receiver to receive the broadcast signal including broadcast service data and low level signaling (LLS) information, wherein the broadcast service data is delivered based on a delivery protocol, the delivery protocol corresponding to a Real-Time Object Delivery over Unidirectional Transport (ROUTE) protocol or an MPEG Media Transport (MMT) protocol; and a parser to parse the LLS information from the broadcast signal;

wherein the LLS information is carried in a physical layer pipe (PLP) in the broadcast signal, wherein the LLS information comprises information for identifying a type of the LLS information, wherein the LLS information further comprises screen clear information for providing information regarding keep screen clear status to avoid obscuring any part of video images, wherein the screen clear information includes version information for indicating a version of the screen clear information and broadcast stream identification information for identifying a broadcast stream which is related to the screen clear information, and wherein the broadcast signal further includes physical layer signaling information that includes flag information for indicating whether a current PLP carries the LLS information.

11. The reception apparatus according to claim 10, wherein the screen clear information further comprises at least one of service identification information for identifying a service in a scope of the broadcast stream that the screen clear information applies to, service identification range information for identifying a range of the service identification information that the screen clear information applies to, and information for indicating a status of the screen clear information.

12. The reception apparatus according to claim 11, wherein, when the service identification information is not present, the screen clear information is applied to all services within the broadcast stream identified by the broadcast stream identification information.

* * * * *